(12) United States Patent
Shikii et al.

(10) Patent No.: US 7,576,908 B2
(45) Date of Patent: Aug. 18, 2009

(54) FIBER DEVICE, WAVELENGTH CONVERTER AND IMAGE FORMING APPARATUS

(75) Inventors: Shinichi Shikii, Nara (JP); Hiroyuki Furuya, Nara (JP); Kiminori Mizuuchi, Osaka (JP); Kauzhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 11/822,443

(22) Filed: Jul. 5, 2007

(65) Prior Publication Data

US 2008/0008431 A1 Jan. 10, 2008

(30) Foreign Application Priority Data

Jul. 6, 2006 (JP) ............................. 2006-186409
Jul. 10, 2006 (JP) ............................. 2006-188875

(51) Int. Cl.
*G02F 2/02* (2006.01)
*H01S 3/10* (2006.01)

(52) U.S. Cl. ............................. 359/326; 372/6; 372/21; 372/22

(58) Field of Classification Search ......... 359/326–332; 372/6, 21–22
See application file for complete search history.

(56) References Cited

U.S. PATENT DOCUMENTS

| 6,996,140 B2 * | 2/2006 | Waarts et al. ................. 372/21 |
| 2004/0258109 A1 * | 12/2004 | Tojo et al. ..................... 372/32 |
| 2007/0230527 A1 * | 10/2007 | Sakai et al. ............... 372/43.01 |
| 2008/0075130 A1 * | 3/2008 | Mizuuchi et al. ................ 372/6 |

FOREIGN PATENT DOCUMENTS

| JP | 5-7038 | 1/1993 |
| JP | 9-246638 | 9/1997 |
| JP | 2004-64031 | 2/2004 |
| JP | 2004-170741 | 6/2004 |
| JP | 2005-19540 | 1/2005 |
| JP | 2005-79197 | 3/2005 |
| JP | 2005-109185 | 4/2005 |
| WO | WO 2006006701 A1 * | 1/2006 |

* cited by examiner

*Primary Examiner*—Hemang Sanghavi
(74) *Attorney, Agent, or Firm*—Wenderoth, Lind & Ponack, L.L.P.

(57) ABSTRACT

The present invention concerns a fiber device capable of shifting an oscillation wavelength of a fundamental wave of a laser emitted therefrom, and is provided with a laser cavity including a fiber containing a laser active substance and having at least one fiber grating formed therein, and a laser light source for introducing an excitation light to the fiber. The laser cavity is constructed to be able to shift the oscillation wavelength of the fundamental wave of the laser emitted therefrom.

32 Claims, 18 Drawing Sheets

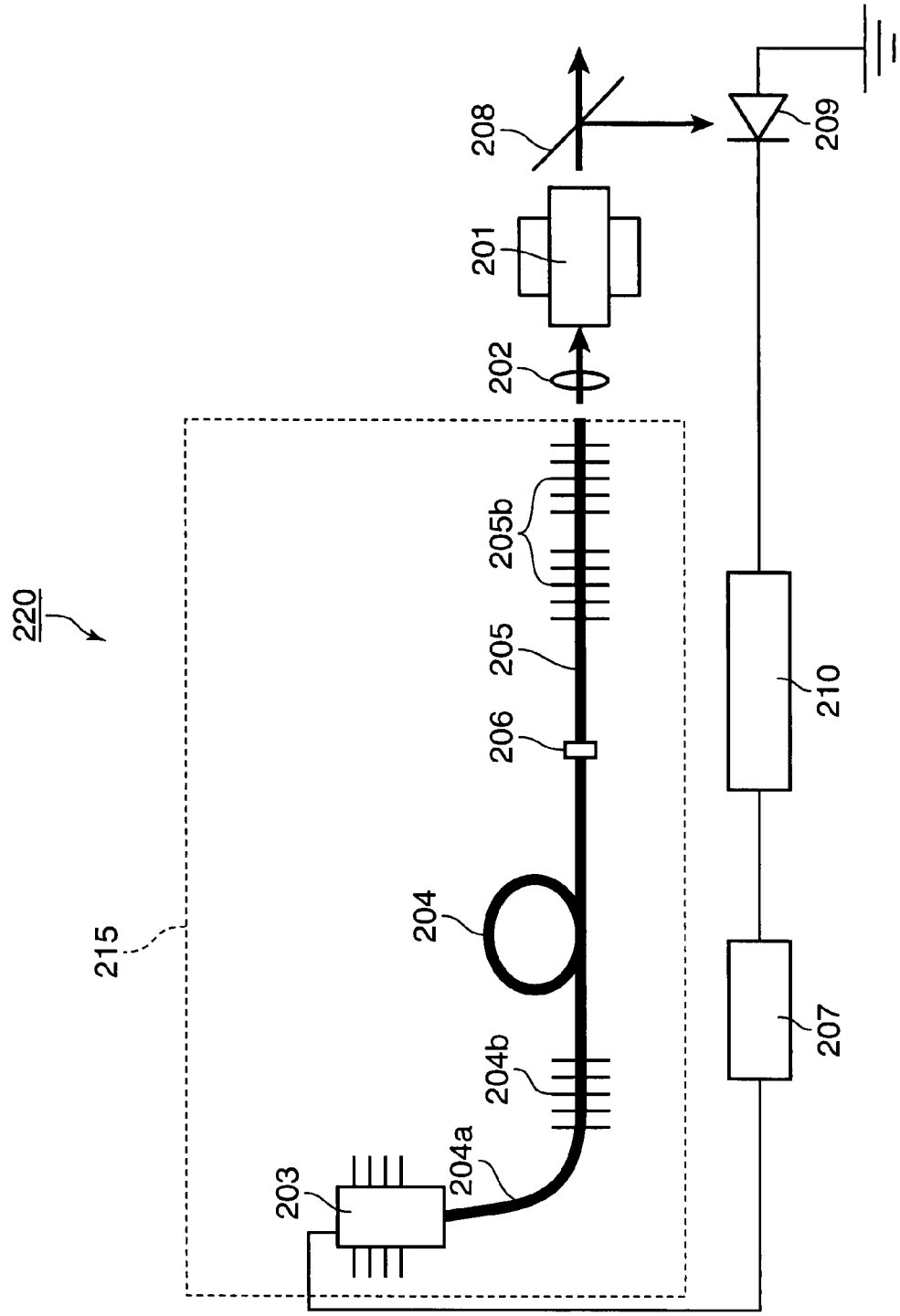

FIBER DEVICE, WAVELENGTH CONVERTER AND IMAGE FORMING APPARATUS

BACKGROUND OF THE INVENTION

1. Field of Technology

The present invention relates to a fiber device for generating a laser light, a wavelength converter for obtaining a stable visible high-output laser light by combining the fiber device and a wavelength conversion element, and an image forming apparatus using this wavelength converter as a light source.

2. Description of the Background Art

Visible light sources having strong monochromaticity and capable of outputting W-class high outputs are necessary in realizing large-scale displays, high-luminance displays and the like. Out of three primary colors of red, green and blue, a red high-output semiconductor laser used in a DVD recorder or the like can be utilized as a small-scale light source having high productivity for a red color. However, for a green or blue light source, realization by means of a semiconductor laser or the like is difficult and there is a demand for a small-scale light source having high productivity. Particularly, it is difficult to obtain a green output light because there is no suitable material that can be constructed as a semiconductor laser, wherefore it is highly difficult to realize a green light source.

Among such light sources, a wavelength converter constructed by combining a fiber laser and a wavelength conversion element is realized as a low-output visible light source. Green and blue small-scale light sources are well-known which utilize a semiconductor laser as a light source for an excitation light for exciting the fiber laser and a nonlinear optical crystal as a wavelength conversion element.

However, several problems need to be solved in order to obtain W-class high-output green and blue lights from such a wavelength converter. FIG. 21 shows a schematic construction of a conventional wavelength converter 220. Based on this construction, the case of obtaining a green output light is described. The wavelength converter 220 shown in FIG. 21 includes a fiber laser 215 for outputting a fundamental wave, a wavelength conversion element 201 for converting the fundamental wave into a green laser light, and a lens 202 for condensing a fundamental wave output to an end surface of the wavelength conversion element 201.

Next, the basic operation of the fiber laser 215 is described. First, in FIG. 21, an excitation light from a laser light source 203 for excitation is incident on one end 204a of a fiber 204. After the incident excitation light is absorbed by a laser active substance contained in the fiber 204, a seed light of the fundamental wave is generated inside the fiber 204. This seed light of the fundamental wave is reflected to reciprocate many times in a laser cavity having a fiber grating 204b formed at the fiber 204 and fiber gratings 205b formed at a fiber 205 different from the fiber 204 as a pair of reflection mirrors. Simultaneously, the seed light is amplified with a gain given by the laser active substance contained in the fiber 204 to increase the light intensity thereof and also has the wavelength thereof selected to reach laser oscillation. It should be noted that the fibers 204 and 205 are connected by a connecting portion 206 and the laser light source 203 is current driven by a laser current source 207 for excitation.

Next, the basic operation of the wavelength converter 220 is described. The fundamental wave is outputted from the fiber laser 215 as described above and is incident on the wavelength conversion element 201 via the lens 202. The fundamental wave from the fiber laser 215 is converted into a harmonic wave by the nonlinear optical effect of the wavelength conversion element 201. This converted harmonic wave is partly reflected by a beam splitter 208, and the harmonic wave having transmitted through the beam splitter 208 becomes a green laser light which is an output light of the wavelength converter 220.

The harmonic wave partly reflected by the beam splitter 208 is utilized by being converted into an electrical signal after being received by a light receiving element 209 for monitoring the output light of the wavelength converter 220. An output controller 210 adjusts a drive current for the laser light source 203 in the laser current source 207 for excitation so that the intensity of this converted signal enables a desired output to be obtained in the wavelength converter 220. Then, the intensity of the excitation light from the laser light source 203 is adjusted, the output intensity of the fundamental wave of the fiber laser 215 is adjusted and, as a result, the output intensity of the wavelength converter 220 is adjusted. In this way, the output intensity of the wavelength converter is kept constant, i.e. a so-called automatic power control (abbreviated as "APC") stably operates.

It is possible to obtain a green high-output laser light of several hundreds mW by such a construction, but it is difficult to obtain a W-class green high-output laser light. Specifically, the fundamental wave of the fiber laser and the output of the excitation light need to be increased in order to increase the light output of the wavelength converter. However, the fiber laser cannot reach the laser oscillation if the length of the fiber 204 exceeds a certain length since an absorbed amount of the fundamental wave increases in proportion to the length even if an attempt is made to increase the gain of the fundamental wave by extending the length of the fiber 204 in the construction of the fiber laser 215 shown in FIG. 21.

The light absorption of the fundamental wave by the fiber notably increases as the oscillation wavelength of the fiber laser is shortened. As the oscillation wavelength is shortened from 1080 nm to 1020 nm, an optimal fiber length becomes shorter. Thus, an interval during which the seed light is amplified is shortened and the output of the fundamental wave obtained from the fiber laser decreases.

In order to increase the output of the fundamental wave in such a situation, the fiber laser is excited by setting the length of the fiber to a suitable length to increase the output of the excitation light. However, since the length of the fiber is not long enough, the excitation light having a fairly high output intensity remains without being completely absorbed. Accordingly, in the case of obtaining a W-class high output from such a wavelength converter using the fiber laser, a problem of the deterioration of the fiber becomes significant due to an increase of the light output as a sum of the fundamental wave and the excitation light in the fiber and a temperature increase resulting from the increased light absorption. There is another problem that the light output in the fiber increases and the laser light source for excitation is damaged by a return light of the increased fundamental wave.

Various artifices have been made to solve these problems. As an example of preventing the damage of the laser light source, a wavelength selecting filter is inserted in a light path in a fiber laser for light communication so that a signal light amplified in the fiber and having a high peak light output does not return to a laser light source for excitation. Utilizing a small wavelength difference between an excitation light and the signal light, this wavelength selecting filter lets the excitation light transmit therethrough, but reflects the signal light. In this way, only the excitation light is emitted from the laser light source for excitation, and the amplified signal light does not return, wherefore the laser light source is not damaged (see, for example, Japanese Unexamined Patent Publication No. H05-7038).

On the other hand, for the prevention of the fiber deterioration, there is an example in which the structure of a fiber doped with a rare-earth element as a laser active substance is devised. Specifically, in a fiber laser for outputting a fundamental wave having a wavelength in a 3 μm band used in the medical field, the absorption of the excitation light is optimized by determining the range of the doped amount of the rare-earth element or by regulating the diameters of the core and clad of the fiber within specified ranges. By adopting such a structure, a high light output of 3 W is obtained without deteriorating the fiber laser (see, for example, Japanese Unexamined Patent Publication No. 2005-79197).

Further, in the light communication field and the like, a connecting structure of a fiber and a guide fiber when an incident light is incident on the fiber, to which a signal light is transmitted, via the guide fiber is devised to prevent the deterioration of the fiber (see, for example, Japanese Unexamined Patent Publication No. 2005-19540).

Further, a core part of a fiber is covered by an outer core made of a material having a higher refractive index than the core part and, in the case where a light output in the fiber increases, a light is caused to leak to the outside of the fiber to suppress an increase of the light output, thereby preventing the deterioration of the fiber (see, for example, Japanese Unexamined Patent Publication No. 2004-170741).

Although being designed to solve problems different from that of the present application, there have been also proposed a construction for reflecting an excitation light in a fiber to separate an oscillated light and the excitation light (see, for example, Japanese Unexamined Patent Publication No. 2005-109185) and a method for improving an excitation efficiency by controlling the temperature of an excitation laser in an ASE light source device using an Yb fiber (see, for example, Japanese Unexamined Patent Publication No. 2004-64031).

However, the above conventional wavelength converter can obtain only 2 to 3 W of the light output of the fiber laser, which is the fundamental wave, and it is difficult for it to obtain such an output of the fundamental wave exceeding 5 W. Thus, W-class high-output green and blue laser lights cannot be obtained. Further, even if the length of the fiber of the fiber laser is simply extended for the purpose of increasing the output of the fundamental wave by increasing the gain of the fiber laser, no large light output can be obtained since an absorbed amount of the fundamental wave by the fiber increases in proportion to the length.

On the other hand, the fiber length needed to be shortened in order to obtain a light having a wavelength equal to or shorter than 1070 nm since the light absorption of the fundamental wave by the fiber becomes significant as the oscillation wavelength of the fiber laser becomes shorter than 1070 nm. However, efficiency decreases if the fiber is shortened. For example, it becomes difficult to ensure high efficiency in the case of generating a light having a wavelength in the vicinity of 1030 nm.

Accordingly, there has been a problem of being difficult to obtain a W-class green laser output having a short wavelength, which should be obtained by shortening the wavelength of the fundamental wave of the fiber laser.

The aforementioned green laser is difficult to realize only by a semiconductor laser, and a method for obtaining a green laser by wavelength conversion using a wavelength conversion element made of, e.g. $LiNbO_3$ or $LiTaO_3$ is a mainstream at present. Further, it is known to use an infrared high-output from a fiber laser excited by a semiconductor laser as a fundamental wave to be incident on the wavelength conversion element.

On the other hand, a visible light source capable of providing a W-class high output having strong monochromaticity is necessary in realizing large-scale displays and high-luminance displays. Developments on high-output light sources are being advanced also for green light sources. Generally, a color display represents colors using light sources of three colors R, G, B and the range of representable colors can be determined in a chromaticity diagram based on the wavelengths of the R, G and B light sources. In a laser display using lasers as the respective R, G and B light sources, the color representation range can be further expanded by using the G light source having a shorter wavelength, wherefore color representation close to original colors is possible.

However, although the color representation close to original colors is made possible by shortening the wavelength of the G light source to expand the color reproduction range, there still remains the range of colors, which cannot be reproduced by any means, since only one wavelength of the G light source is determined.

On the other hand, in a laser display for representing an image by scanning a laser, the laser needs to be modulated in accordance with an image data, and an acoustooptical element and a light modulation element using $LiNbO_3$, for example, as disclosed in Japanese Unexamined Patent Publication No. H09-246638 have been proposed for a laser modulation method.

The use of the acoustooptical element or the light modulation element using $LiNbO_3$ is disadvantageous in terms of space for the laser modulation as well, and has an additional problem of becoming more expensive.

SUMMARY OF THE INVENTION

An object of the present invention is to provide a fiber device capable of shifting an oscillation wavelength of a fundamental wave emitted therefrom.

One aspect of the present invention is directed to a fiber device, comprising a laser cavity including a fiber containing a laser active substance, the fiber having at least one fiber grating formed therein, and a laser light source for introducing an excitation light to the fiber, wherein the laser cavity shifts an oscillation wavelength of a fundamental wave of a laser emitted therefrom.

The above fiber device can emit fundamental waves of lasers having different oscillation waves.

These and other objects, features, and advantages of the present invention will become more apparent upon reading the following detailed description along with the accompanying drawings.

BRIEF DESCRIPTION OF THE DRAWINGS

FIG. 21 is a schematic diagram showing the construction of a conventional wavelength converter.

DETAILED DESCRIPTION OF THE PREFERRED EMBODIMENTS OF THE INVENTION

Figure 1:
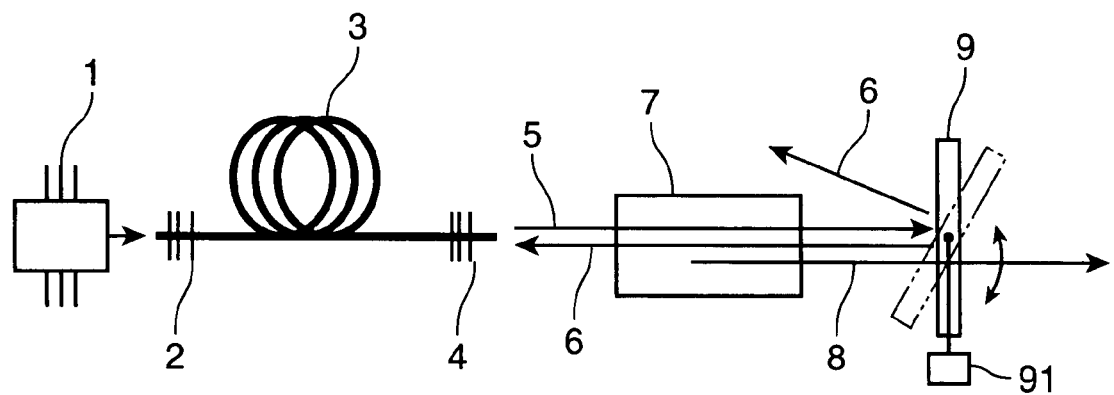
FIG. 1 is a schematic diagram showing the construction of a fiber device according to a first embodiment of the invention.

Hereinafter, fiber devices, wavelength converters and image display devices according to embodiments of the present invention are described with reference to the accompanying drawings. It should be noted that the same parts are identified by the same reference numerals and those assigned with the same reference numerals in the drawings may not be repeatedly described in some cases.

First Embodiment

FIG. 1 is a diagram showing the schematic construction of a fiber device according to a first embodiment of the present invention. The fiber device according to this embodiment is for generating a fundamental wave whose wavelength can be switched and is provided with an excitation light source 1, a fiber 3, a fiber grating 2 toward the side of the excitation light source (hereinafter, "first fiber grating"), a fiber grating 4 at an emission side (hereinafter, "second fiber grating") and a first reflector 9 for switching the wavelength of the fundamental wave as shown in FIG. 1. This fiber device constructs an optical system (wavelength converter) together with a wavelength conversion element 7 for wavelength-converting the emitted fundamental wave.

An excitation laser emitted from the excitation light source 1 is introduced to the fiber 3, propagates in the fiber 3 while transmitting through the first fiber grating 2 and being absorbed by a laser active substance, and disappears in the fiber 3 before finishing passing through the fiber 3. A seed light of the fundamental wave generated during this time is amplified by an excitation laser emitted from the excitation light source 1 while reciprocating in a cavity constructed by the first and second fiber gratings 2, 4, and reaches laser oscillation as a high-output fundamental wave.

In this embodiment, the first fiber grating 2 has a reflection spectrum in a wide band having a width of about 1 nm and the reflectance thereof is set substantially at 100%, whereas the second fiber grating 4 has a reflection spectrum in a narrow band having a width of about 0.1 nm and the reflectance thereof is set at about 10%.

Normally, the fundamental wave is oscillated by a construction including only the excitation light source 1, the fiber 3, and the first and second fiber gratings 2, 4. However, in this embodiment, the first reflector 9 is added to this construction, so that a specified amount of the emitted fundamental wave is returned to the fiber 3 to switch the wavelength of the fundamental wave. This construction is described below.

A forward fundamental wave 5 emitted from the fiber 3 and propagating toward the first reflector 9 is partly converted into a harmonic wave 8 by the wavelength conversion element 7 and the remaining fundamental wave having transmitted through the wavelength conversion element 7 is incident on the first reflector 9. Here, in a state where the first reflector 9 is so arranged as to curb a light amount of a return fundamental wave 6 propagating from the first reflector 9 toward the excitation light source 1 and returning to the fiber 3 to or below a specified level, this return light has no influence on an oscillation wavelength of the forward fundamental wave 5 and continues to oscillate at a wavelength determined by the second fiber grating 4. In this case, the oscillation wavelength of the fundamental wave 5 is specified by the band of the second fiber grating 4 having a narrower bandwidth. A state where the cavity for oscillating the fundamental wave 5 is formed by the first and second fiber gratings 2, 4 is called a "state 1" below.

Contrary to this, a situation is considered where the first reflector 9 is so arranged as to return a light amount of the fundamental wave 6 equal to or larger than a specified level to the fiber 3 and the return fundamental wave 6 propagates in a direction substantially opposite to the propagation direction of the forward fundamental wave 5. In the "state 1", the cavity for oscillating the fundamental waves 5 and 6 is formed by the fiber gratings 2 and 4. However, since the reflectance of the second fiber grating 4 is as low as about 10%, the cavity comes to be formed by the first fiber grating 2 and the first reflector 9 if the amount of the return light from the first reflector 9 to the fiber 3 becomes larger than a reflected light amount by the second fiber grating 4. In this case, the oscillation wavelength of the fundamental waves 5, 6 depends on the band of the first fiber grating 2, and the fundamental waves 5, 6 come to oscillate at a wavelength different from the one determined by the second fiber grating 4. In this case, the oscillation wavelength of the fundamental waves 5, 6 cannot be specified by the second fiber grating 4 and is displaced from the oscillation wavelength in the "state 1". The state where the cavity for oscillating the fundamental waves 5, 6 is formed by the first fiber grating 2 and the first reflector 9 is called a "state 2".

Next, the oscillation of the harmonic wave 8 in the "state 1" and "state 2" is described. In the "state 1", the fundamental waves 5, 6 oscillate at a wavelength locked in the band of the second fiber grating 4. If the wavelength conversion element 7 conforms to the band wavelength of the second fiber grating 4, a phase matching condition is satisfied in the wavelength conversion element 7 in the "state 1" to oscillate the harmonic wave 8.

Upon the transition from the "state 1" to the "state 2" by a movement of the first reflector 9, the wavelength of the fundamental waves 5, 6 is displaced and the phase matching condition of the wavelength conversion element 7 cannot be satisfied at the same temperature as in the "state 1". Thus, the harmonic wave 8 oscillated in the "state 1" disappears.

According to the first embodiment of the present invention, the wavelength of the fundamental waves 5, 6 can be displaced only by operating the first reflector 9 to switch the state between the "state 1" and "state 2", whereby the oscillation and disappearance of the harmonic wave 8 can be easily switched.

In this embodiment, it is preferable to coat the first reflector 9 with a coating whose transmittance or reflectance differs depending on the wavelength so as to reflect the fundamental wave and let the harmonic wave transmit therethrough in this embodiment, since a larger amount of the harmonic wave can be obtained. For example, it is preferable to use an optical module operable at high speed such as a galvanometer mirror as the first reflector 9. This can realize the high-speed switching between the "state 1" and the "state 2". In this case, the first reflector 9 may be driven by a driving portion 91 as shown in FIG. 1.

Further, by extracting the harmonic wave generated when the fundamental wave 6 as a return light from the first reflector 9 in the "state 1" transmits through the wavelength conversion element 7 in this embodiment, a total output of the harmonic wave can be improved. For example, in the case where the "state 1" is set by slightly displacing the first reflector 9 in the "state 2", the return fundamental wave 6 transmits through the wavelength conversion element 7 although being slightly deviated from a light path of the forward fundamental wave 5, and an unillustrated harmonic wave of a direction opposite to that of the harmonic wave 8 is generated at this time. The harmonic wave generated in this way can also be extracted by providing an unillustrated extraction mirror such as a dichroic mirror between the wavelength conversion element 7 and the fiber 3.

Second Embodiment

Figure 2:
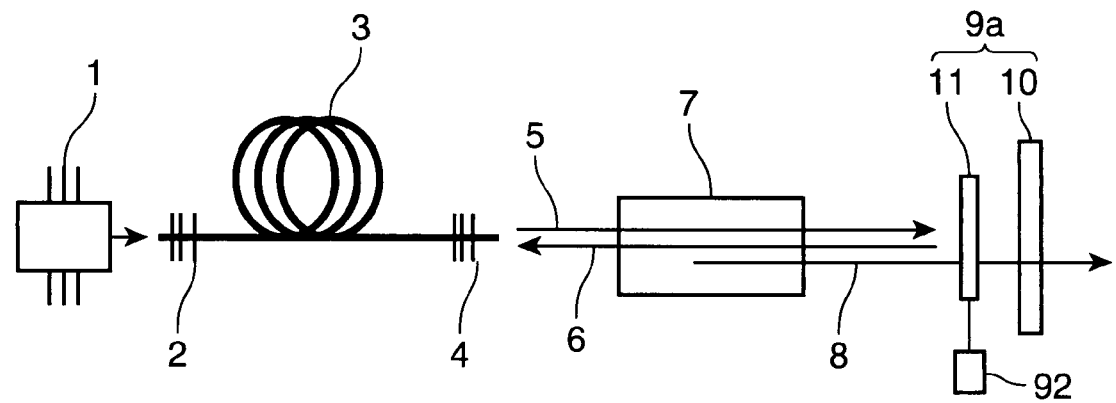
FIG. 2 is a schematic diagram showing the construction of a fiber device according to a second embodiment of the invention.

Next, a second embodiment of the present invention is described. In the first embodiment, the wavelength of the fundamental wave is displaced by adjusting the amount of the return light to the fiber through the movement of the optical module operable at high speed. On the other hand, in this embodiment, the wavelength of the fundamental wave is displaced by attenuating the intensity of a light emitted from the fiber. FIG. 2 shows the schematic construction of a fiber device according to this embodiment.

As shown in FIG. 2, the fiber device according to this embodiment is provided with an excitation light source 1, a fiber 3, a first fiber grating 2, a second fiber grating 4 and a second reflector 9a for switching the wavelength of a fundamental wave, and constructs an optical system (wavelength converter) together with a wavelength conversion element 7 for wavelength-converting the emitted fundamental wave. The second reflector 9a is for modulating an amount of light emitted from the fiber 3 and returned to the fiber 3 again and includes an attenuator 11 and a reflecting member 10.

A fundamental wave 5 emitted from the fiber 3 is partly converted into a harmonic wave 8 in the wavelength conversion element 7 as in FIG. 1, and the remaining fundamental wave transmits through the wavelength conversion element 7, is incident on the attenuator 11 to be attenuated by a specified light amount, and reaches the reflecting member 10. The fundamental wave 5 reflected by the reflecting member 10 transmits through the attenuator 11 and the wavelength conversion element 7 again to return to the fiber 3. At this time, if the transmittance of the attenuator 11 is adjusted such that a light amount of a return fundamental wave 6 reflected by the reflecting member 10 to return to the fiber 3 is larger than a light amount of the fundamental wave 6 reflected by the second fiber grating 4, the "state 2" described in the first embodiment is set. Conversely, if the transmittance of the attenuator 11 is adjusted such that a light amount of the return fundamental wave 6 reflected by the reflecting member 10 to return to the fiber 3 is smaller than the light amount of the fundamental wave 6 reflected by the second fiber grating 4, the "state 1" described in the first embodiment is set. In other words, an oscillation wavelength of the fiber 3 can be selected and further the oscillation and disappearance of the harmonic wave 8 can be controlled by modulating the transmittance of the attenuator 11. The transmittance of the attenuator 11 may be controlled by a controller 92 as shown in FIG. 2.

In this embodiment, the switching between the "state 1" and the "state 2" is determined only by a ratio of the amount of light reflected by the second fiber grating 4 to the amount of light reflected by the second reflector 9a to return to the fiber 3. Thus, the attenuation rate of the attenuator 11 does not depend on an absolute value of a light amount of the fundamental wave desired to be outputted upon the switching between the "state 1" and the "state 2" and can be set to be constant. Accordingly, it is not necessary to accurately control the attenuation rate of the attenuator 11, and the construction of the second reflector 9a can be simplified.

Further, although the attenuator 11 is arranged between the wavelength conversion element 7 and the reflecting member 10 in this embodiment, it may be arranged between the fiber 3 and the wavelength conversion element 7. By doing so, a power loss upon the passage of the harmonic wave 8 emitted from the wavelength conversion element 7 through the attenuator 11 is eliminated and it becomes unnecessary to apply coating to the attenuator 11 itself so as to let the harmonic wave 8 transmit therethrough.

In this embodiment, it can be thought to use a double-clad polarization maintaining fiber capable of propagating, for example, a high-output excitation laser as the fiber 3. In this case, the excitation laser propagates in a relatively wide area including a core part of the fiber 3 and an inner clad to be absorbed by a laser active substance contained in the core part of the fiber 3. A rare-earth element Yb is, for example, known as the laser active substance contained in the core part of the fiber 3. It is known that stimulated emission occurs at a wavelength of 1030 to 1100 nm if an excitation laser is incident on this fiber containing the rare-earth element Yb from a semiconductor laser having a wavelength of 915 or 975 nm.

In this embodiment, the wavelength conversion element 7 is preferably a SHG element made of a nonlinear optical crystal having a periodic polarization reversal structure. $KTiOP_4$, $LiNbO_3$ or $LiTaO_3$ is used as the SHG element having a periodic polarization reversal structure. Alternatively, $LiNbO_3$ or $LiTaO_3$ doped with Mg or $LiNbO_3$ or $LiTaO_3$ having a stoichiometric composition can also be used. These crystals are capable of highly efficient wavelength conversion since having high nonlinearity coefficients. There is another advantage of enabling a phase matching wavelength to be freely set by changing the periodic structure.

Third Embodiment

Figure 3:
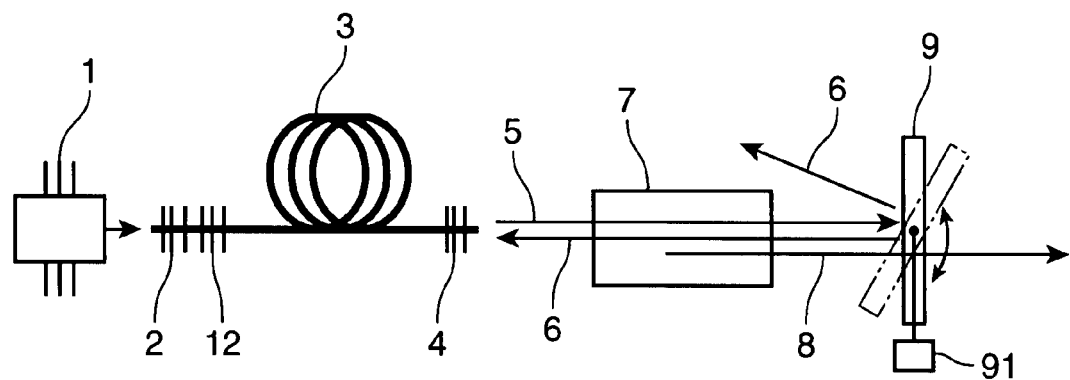
FIG. 3 is a schematic diagram showing the construction of a fiber device according to a third embodiment of the invention.

Next, a third embodiment of the present invention is described. In the above first and second embodiments, the oscillation wavelength of the fundamental wave is switched by using the first fiber grating 2 as one reflection surface of the cavity for oscillating the fundamental wave while using the second fiber grating 4 or the first reflector 9 (or second reflector 9a) as the other reflection surface. On the other hand, in this embodiment, another fiber grating at the side toward the excitation light source is added, so that the one reflection surface of the cavity for oscillating the fundamental wave can also be switched between the two fiber gratings at the side toward the excitation light source. FIG. 3 is a diagram showing the schematic construction of a fiber device according to the third embodiment of the present invention.

As shown in FIG. 3, the fiber device according to this embodiment is provided with an excitation light source 1, a fiber 3, a first fiber grating 2, a second fiber grating 4 and a first reflector 9 for switching the wavelength of the fundamental wave, and constructs an optical system (wavelength converter) together with a wavelength conversion element 7 for wavelength-converting the emitted fundamental wave. This fiber device is further provided with a fiber grating 12 at a side of the fiber 3 toward the excitation light source 1 (hereinafter, "third fiber grating"). Although the first reflector 9 of the first embodiment is used as a reflector for returning a light emitted from the fiber 3 to the fiber 3 again in this embodiment, it is no problem to use the second reflector 9a of the second embodiment.

As shown in FIG. 3, the third fiber grating 12 is arranged between the first and second fiber gratings 2, 4 and near the first fiber grating 2. The third fiber grating 12 is a narrow-band fiber grating having a bandwidth of about 0.1 nm, and the band thereof is so set as not to be included in that of the first fiber grating 2.

The band of the third fiber grating 12 is set at a longer wavelength side than that of the first fiber grating 2 so that the oscillation of the fundamental wave by the third fiber grating 12 can be easily realized. Since the band of the second fiber grating 4 should be included in that of the first fiber grating 2, there is no overlapping of the bands of the second and third fiber gratings 4, 12.

The reflectance of the third fiber grating 12 is set maximally high, and is substantially preferably a value close to 100%. Thus, a fundamental wave 6 returned to the fiber 3 to realize the "state 2" by the first reflector 9 is amplified by a cavity formed by the third fiber grating 12 and the first reflector 9 other than by a cavity formed by the first fiber grating 2 and the first reflector 9. As a result, the oscillation wavelength of the fundamental waves 5, 6 is specified by the band of the third fiber grating 12 having a narrow bandwidth, thereby being changed from the wavelength before a movement of the first reflector 9.

Specifically, the reflectance of the third fiber grating 12 is set maximally high and the band of the third fiber grating 12 is set down within such a wavelength range where the fiber 3 can oscillate and at a longer wavelength side than the band of the first fiber grating 2, whereby the oscillation wavelength of the fundamental wave can be switched through an increase or decrease of an amount of return light caused by the movement of the first reflector 9. Since the switchable oscillation wavelength of the fundamental wave can be arbitrarily set by the setting of the bands of the second and third fiber gratings 4, 12, it can be realized to switchingly oscillate two fundamental waves having different oscillation wavelengths intentionally selected beforehand.

In this embodiment, a phase matching condition of the wavelength conversion element 7 is set to be satisfied by either one of the oscillation wavelength specified by the second fiber grating 4 and the oscillation wavelength specified by the third fiber grating 12. By doing so, the wavelength conversion element 7 can emit a harmonic wave through the wavelength conversion thereof by the incidence of the fundamental wave having a wavelength satisfying the phase matching condition of the wavelength conversion element 7. Accordingly, it becomes possible to or not to oscillate the harmonic wave by the movement of the first reflector 9. It does not matter which crystal the wavelength conversion element 7 uses out of a nonlinear crystal using temperature phase matching, a nonlinear crystal using angle phase matching and a nonlinear crystal using quasi phase matching.

Fourth Embodiment

Figure 4:
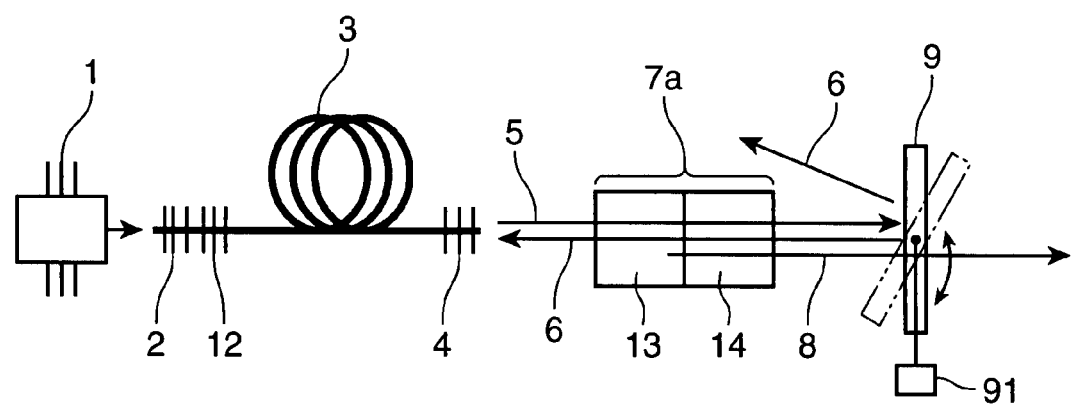
FIG. 4 is a schematic diagram showing the construction of a fiber device according to a fourth embodiment of the invention.

Next, a fourth embodiment of the present invention is described. In the third embodiment, the oscillation of the harmonic wave is switched on and off by switching the emission of two fundamental waves having different oscillation wavelengths. On the other hand, in this embodiment, it is made possible to oscillate the harmonic wave in either case upon switching the emission of the two fundamental waves having different oscillation wavelengths. FIG. 4 is a diagram showing the schematic construction of a fiber device according to the fourth embodiment of the present invention.

As shown in FIG. 4, the fiber device according to this embodiment is provided with an excitation light source 1, a fiber 3, a first fiber grating 2, a second fiber grating 4, a first reflector 9 for switching the wavelength of the fundamental wave and a third fiber grating 12, and constructs an optical system (wavelength converter) together with a wavelength conversion element 7a for wavelength-converting the emitted fundamental wave. Although the first reflector 9 of the first embodiment is used as a reflector for returning a light emitted from the fiber 3 to the fiber 3 again in this embodiment as well, it is no problem to use the second reflector 9a of the second embodiment.

The fiber device according to this embodiment differs from the third embodiment in that a wavelength conversion element having a plurality of wavelength conversion areas with phase matching conditions corresponding to two fundamental waves having different oscillation wavelengths is used as a wavelength conversion element for wavelength-converting a fundamental wave emitted from the fiber device. This point is described below. It should be noted that the fourth embodiment is similar to the third embodiment except this point and similar points are not described here.

The wavelength conversion element 7a has two wavelength conversion areas, i.e. a first wavelength conversion area 13 and a second wavelength conversion area 14. For example, the wavelength conversion element 7a is made of a nonlinear crystal using quasi phase matching, and the first and second wavelength conversion areas 13, 14 formed with polarization reversal periods are arranged one after the other in a propagation direction of a fundamental wave 5. For example, the polarization reversal periods formed in the first wavelength conversion area 13 correspond to the fundamental wave 5 having an oscillation wavelength specified by the second fiber grating 4 and those formed in the second wavelength conversion area 14 correspond to the fundamental wave 5 having an oscillation wavelength specified by the third fiber grating 12.

In this case, upon the switching between the "state 1", and the "state 2" by the movement of the first reflector 9, a harmonic wave is, for example, oscillated in the first wavelength conversion area 13 corresponding to the band wavelength of the second fiber grating 4 to be emitted after transmitting through the first reflector 9 in the "state 1". Further, in the "state 2", a harmonic wave is oscillated in the second wavelength conversion area 14 corresponding to the band wavelength of the third fiber grating 12 to be emitted to the outside in the "state 2".

According to this embodiment, two harmonic waves having different oscillation wavelengths can be switchingly oscillated.

Fifth Embodiment

Figure 5:
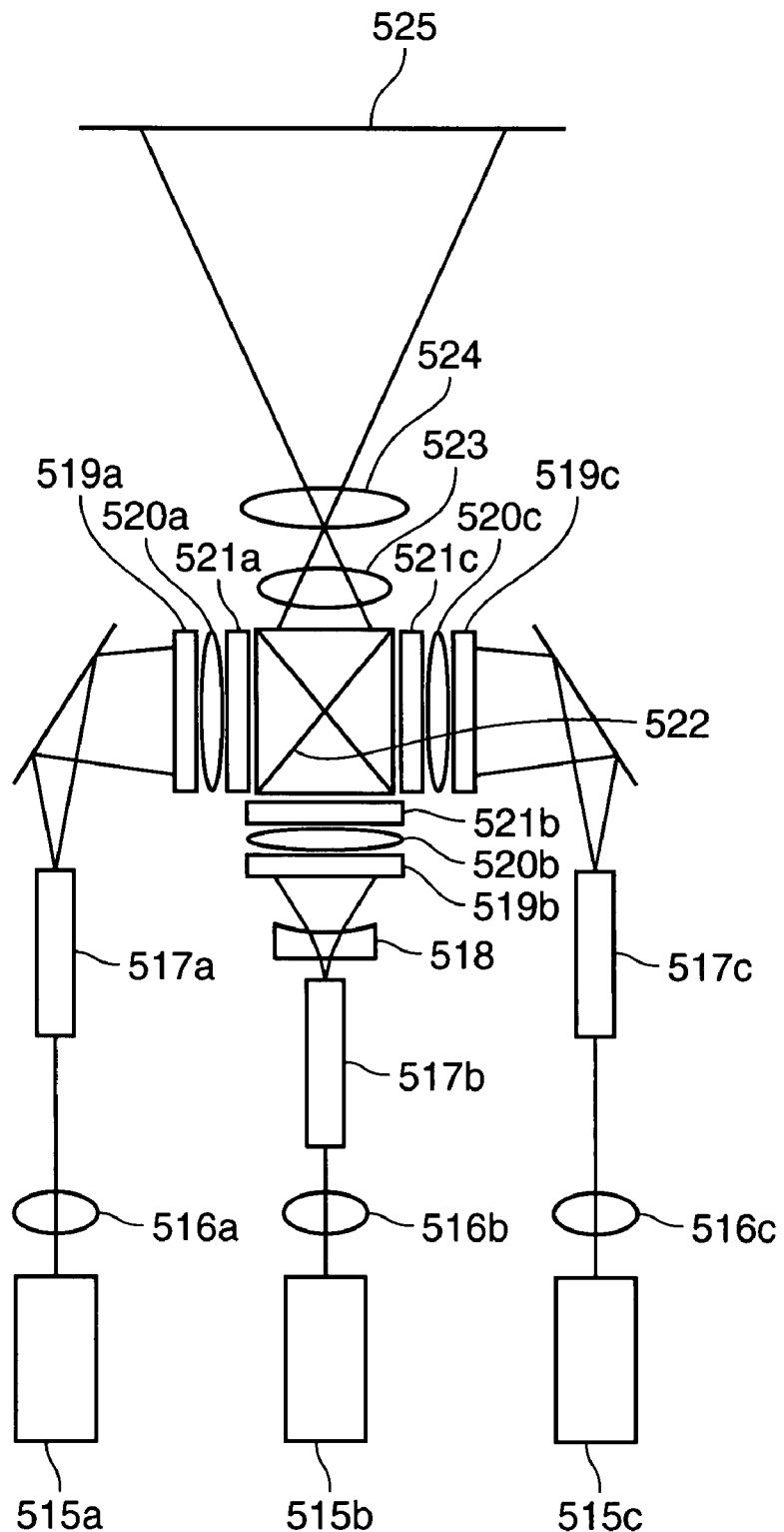
FIG. 5 is a schematic diagram showing the construction of a two-dimensional image display device according to a fifth embodiment of the invention.

Next, a fifth embodiment of the present invention is described. An application, for example, to a laser projection television can be thought as a specific mode using a wavelength converter using the fiber device according to any one of the above first to fourth embodiments as a light source. This embodiment is an example of a laser display (two-dimensional image display device) to which a wavelength converter using the fiber device according to any one of the above first to fourth embodiments is applied. FIG. 5 shows the schematic construction of the laser display according to this embodiment.

As shown in FIG. 5, three laser light sources 515a, 515b and 515c of red (R), green (G) and blue (B) are used as light sources in this embodiment. An AlGaInP/GaAs semiconductor laser having a wavelength of 638 nm is used as the R light source 515a, and a GaN semiconductor laser having a wavelength of 465 nm is used as the B light source 515c. A wavelength converter using the fiber device according to any one of the above first to fourth embodiments is used as the G light source 515b. Laser beams emitted from the respective R, G and B light sources 515a, 515b and 515c are caused to scan diffusers 519a, 519b and 519c by two-dimensional beam scanning means 517a, 517b and 517c after being condensed by condenser lenses 516a, 516b and 516c.

An image data is divided into R-, G- and B-data, signals of which are inputted to spatial light modulation elements 521a, 521b and 521c after being focused by field lenses 520a, 520b and 520c. Thereafter, the inputted signals are multiplexed by a dichroic prism 522 to form a color image. The multiplexed beams are projected onto a screen 525 through projection lenses 523 and 524. A concave lens 518 is inserted in an incident light path from the G light source 515b to the spatial light modulation element 521b in order to equalize the spot size of the G-light in the spatial light modulation element 521b with those of the R-light and B-light.

Since the laser light sources are used as the R, G and B light sources in the laser display according to this embodiment in this way, the laser display can have a high luminance and a thin configuration.

Figure 6:
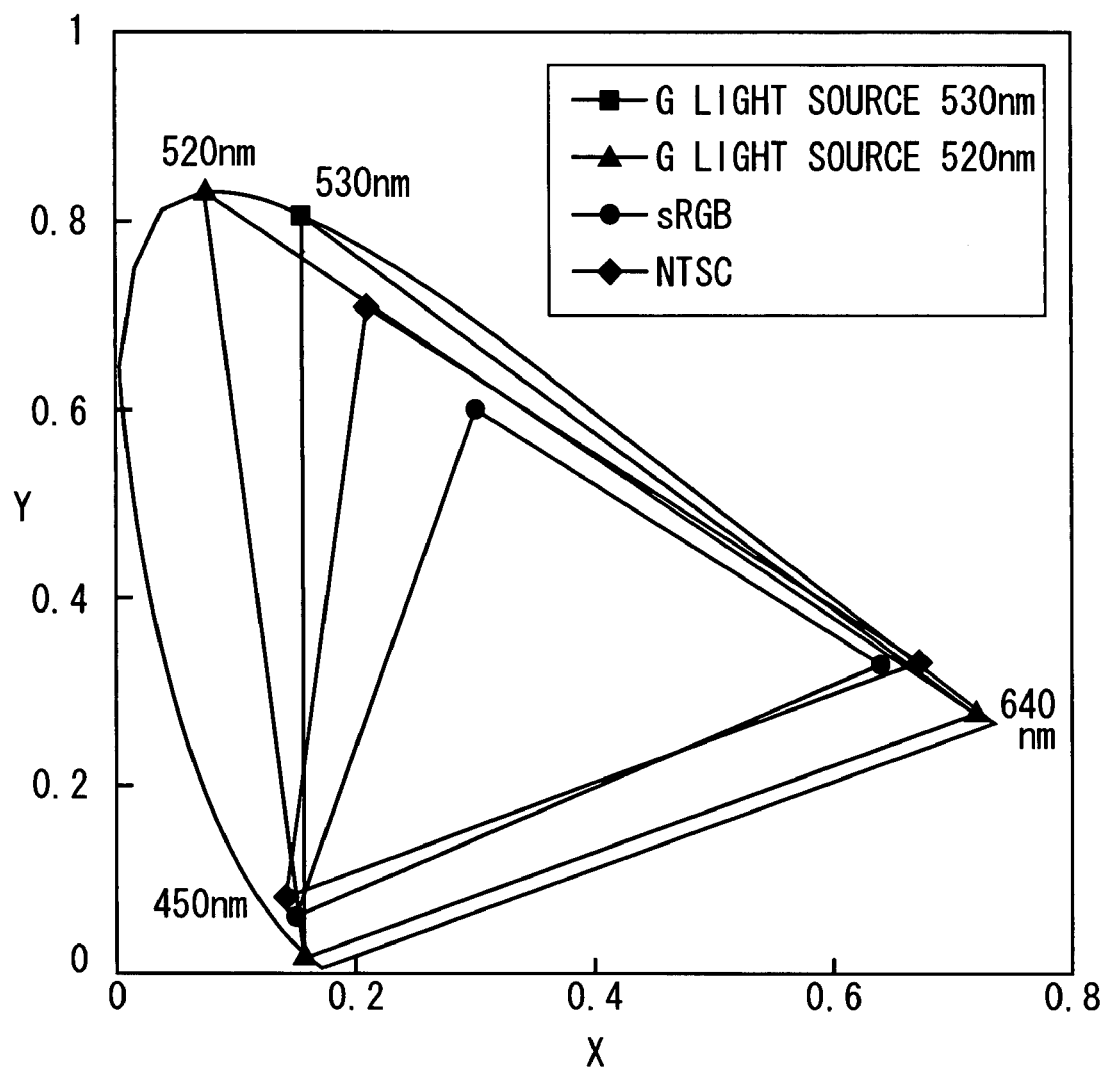
FIG. 6 is a chromaticity diagram showing a sRGB standard, an NTSC standard and a color reproduction range of the two-dimensional image display device according to the fifth embodiment of the invention.

Further, a color reproduction range can be more expanded as compared to those specified by the sRGB standard and the NTSC standard and color representation close to original colors is possible by using the monochromatic laser light sources for R, G and B. FIG. 6 shows color reproduction ranges when the wavelength of the G light source is 520 nm and 530 nm, assuming that the wavelengths of the R and B light sources are, for example, 640 nm and 450 nm, respectively. It can be understood that an area of a triangular color representation range is about twofold as compared to the sRGB standard and about 1.4-fold as compared to the NTSC standard when the wavelength of the G light source is 530 nm, and that the color representation range is even enlarged to be about 2.1-fold as compared to the sRGB standard and about 1.5-fold as compared to the NTSC standard when the wavelength of the G light source is 520 nm. If the wavelength of the G light source can be selected from these two wavelengths, an image reproduction range can be selectively expanded. As shown in FIG. 6, in the example in which the wavelength of the G light source is 520 nm and 530 nm, there is a mutually overlapping range, but there are many ranges that can be reproduced only at the respective wavelengths. If it becomes possible to switch the wavelength of the G light source, it is also possible for a user to select, for example, a green tone to his taste and also possible to represent by automatically selecting the wavelength of the G light source in accordance with image information.

Besides, since a luminosity factor is, for example, higher at 530 nm than at 520 nm, a light emission amount can be generally lower at 530 nm. Thus, 520 nm having a wider representation range is used if a battery has a large remaining amount and the wavelength is switched to 530 nm to reduce the light emission amount if the remaining amount of the battery decreases or the wavelength is switched to 530 nm if a power saving mode is set by a user, for example, in a portable display or the like. Specifically, it can be thought to provide a projector or a remote controller for a projector with changeover buttons such as "high image quality mode" button, "energy saving mode" button and "image quality changeover mode" button and to cause a wavelength switching means to operate as the respective modes are switched in the projector or the remote controller for the projector.

According to this embodiment, a high-output green light source having a visible range can be realized and applied in the display field such as large-scale displays and high-luminance displays by being combined with red and blue high-luminance lasers.

According to the above first to fifth embodiments, the oscillation wavelength of the fundamental wave can be simply switched in the construction for wavelength-converting the output of the fiber laser output into a harmonic wave. In addition, it is possible to on/off modulate the harmonic wave obtained by wavelength-converting the fundamental wave and to selectively oscillate the harmonic waves of two wavelengths.

Sixth Embodiment

Figure 7:
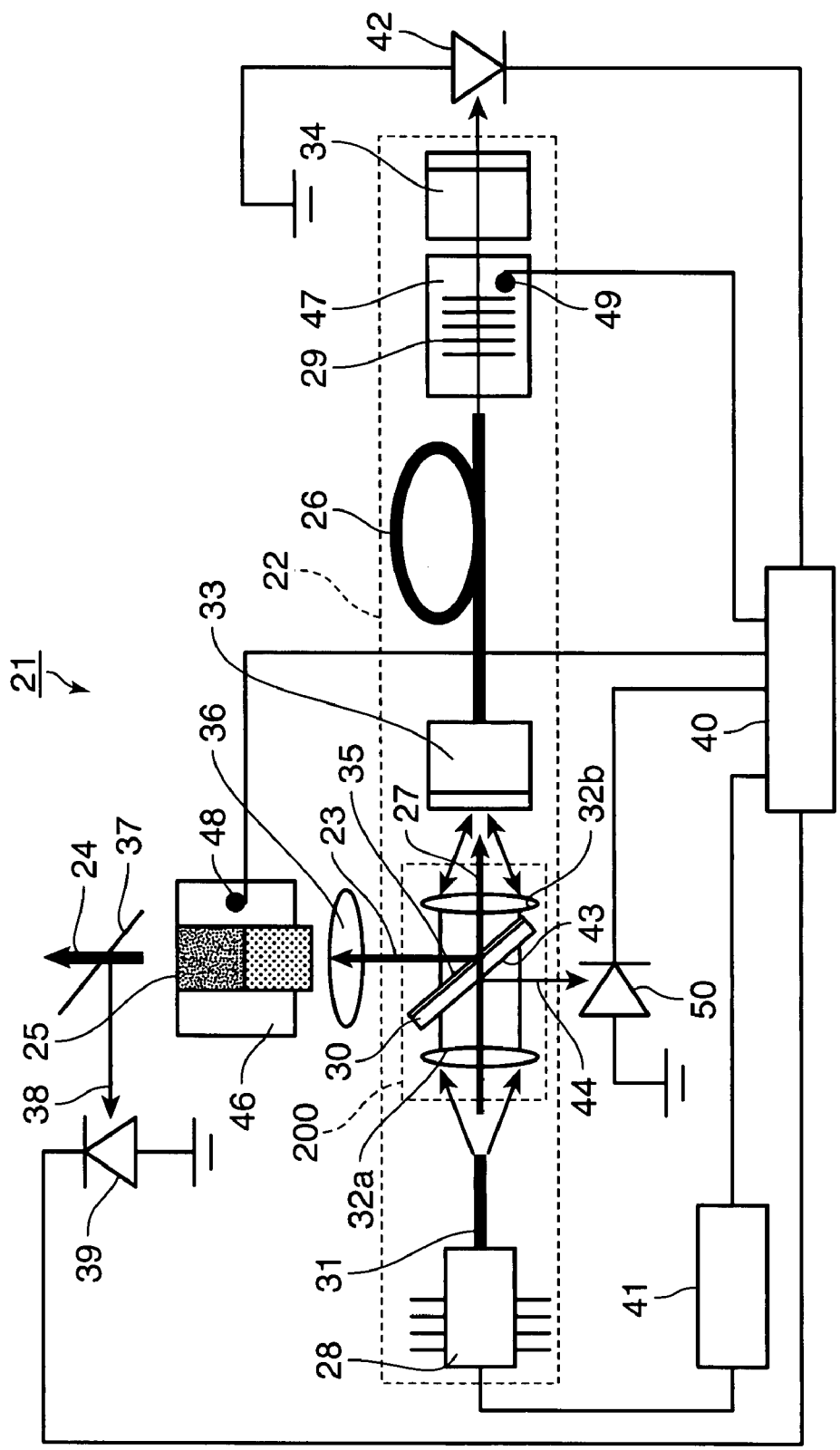
FIG. 7 is a schematic diagram showing the construction of a wavelength converter according to a sixth embodiment of the invention.

Next, a sixth embodiment of the present invention is described. FIG. 7 shows the construction of a wavelength converter according to the sixth embodiment of the present invention. A wavelength converter 21 shown in FIG. 7 is provided with a fiber laser 22, a wavelength conversion element 25 for converting a fundamental wave 23 emitted from the fiber laser 22 into a harmonic wave output 24, and a condenser lens 36 arranged between the fiber laser 22 and the wavelength conversion element 25 as a basic construction.

Main components of the fiber laser 22 include a laser cavity comprised of a fiber grating 29 and a fiber 26 containing a laser active substance, a laser light source 28 for emitting an excitation light 27 to the fiber 26, an optical system 200 with an extraction mirror 30 for extracting the fundamental wave 23 emitted from the fiber 26 in a direction toward the wavelength conversion element 25, and first and second reflection surfaces 34, 33 formed at the respective end surfaces of the fiber 26. It should be noted that the laser cavity including the fiber 26 is for amplifying and emitting the fundamental wave 23 using the fiber grating 29 and the second reflection surface 33 formed at one end surface of the fiber 26 as a pair of reflection surfaces.

Specifically, the fiber laser 22 includes the laser light source 28 for outputting the excitation light 27 to be incident on the fiber 26, the fiber grating 29 for selecting the wavelength of the fundamental wave and reflecting the fundamental wave, the fiber 26 having the first and second reflection surfaces 34, 33 formed at the respective end surfaces, and the optical system 200 with the extraction mirror 30 for introducing the fundamental wave 23 as an output to the wavelength conversion element 25. It should be noted that the extraction mirror 30 functions to couple the laser light source 28 and the fiber 26 by letting the excitation light 27 transmit therethrough and to introduce the fundamental wave 23 emitted from the fiber 26 to the wavelength conversion element 25 by reflecting the fundamental wave 23.

By utilizing the fiber grating 29 as one reflection surface of the laser cavity of the fiber laser 22, it becomes possible to select an arbitrary reflection center wavelength to enable the arbitrary selection of an oscillation center wavelength, and to generate a fundamental wave having a wavelength band of 0.05 to 0.2 nm required by the wavelength conversion element 25.

The fiber grating 29 is formed by a polarization maintaining fiber. Generally, the polarization maintaining fiber has a large birefringence and can transmit a light while maintaining its polarization state. In this embodiment, by forming the fiber grating 29 on the polarization maintaining fiber, the fiber grating 29 is caused to possess such a reflection characteristic having two peaks close to each other by the utilization of the birefringence of the polarization maintaining fiber. It is difficult for a reflection mirror using a dielectric multilayer film to obtain such two reflection peaks lying in a narrow band and close to each other. In the case of using a reflection surface having a broad band such as a dielectric multilayer film, it is difficult to arbitrarily select a wavelength and it becomes a cause of making the oscillation wavelength unstable since oscillation occurs at a wavelength where the gain of the fiber is high (oscillation occurs at a wavelength likely to oscillate).

Further, by using a single mode fiber independent of polarization as the fiber 26 and arranging a polarization unifying mechanism on the second reflection surface 33 at the end surface of the fiber 26, the fundamental wave having two peaks by being reflected by the fiber grating 29 can be obtained in the form of a single polarized light.

Since the oscillation wavelength is 1020 to 1100 nm in this embodiment, the core diameter of the fiber 26 needs to be 4.5 to 6.5 μm. If the core diameter is equal to or larger than 10 μm, highly efficient wavelength conversion cannot be realized since a transverse mode of a laser beam is a multimode.

If the laser cavity is a closed system in the fiber 26, an output decrease and an output variation with time resulting from an increased loss of the cavity due to dust from the outside or the misalignment of the reflection surfaces can be suppressed.

Next, the basic operation of the fiber laser 22 of FIG. 7 is described. In FIG. 7, the excitation light 27 from the pigtail laser light source 28 propagates in a fiber 31 belonging to the laser light source 28 and, then, transmits through the extraction mirror 30 after being converted into a parallel light by a collimator lens 32a of the optical system 200. The excitation light 27 is further condensed by a condenser lens 32b of the optical system 200 to be incident on the fiber 26 through the second reflection surface 33 of the fiber 26. The incident excitation light 27 propagates in the fiber 26 while being absorbed by the laser active substance contained in the fiber 26. After transmitting through the fiber grating 29, the excitation light 27 is reflected by the first reflection surface 34, returns in the fiber 26 while being absorbed by the laser active substance and disappears by being substantially completely absorbed by the laser active substance during one round trip before reaching the second reflection surface 33. Since the excitation light is absorbed only while propagating in one direction in the fiber with the conventional technology, a gain for amplifying the fundamental wave decreases along the propagation direction of the excitation light. On the other hand, since the excitation light 27 is absorbed while making one round trip in the fiber 26 in this embodiment, the gain for amplifying the fundamental wave is uniformly high in the fiber 26 as compared to the conventional technology.

As described above, in this embodiment, a seed light of the fundamental wave 23 is generated in the fiber 26 with the excitation light 27 substantially completely absorbed by making one round trip in the fiber 26 and with the gain for amplifying the fundamental wave set uniformly high in the fiber 26. This seed light of the fundamental wave 23 reciprocates many times in this laser cavity while increasing the intensity thereof to reach laser oscillation, using the second reflection surface 33 of the fiber 26 and the fiber grating 29 as one pair of reflection surfaces of the laser cavity.

A double-clad polarization maintaining fiber capable of propagating the high-output excitation light 27 was used, for example, as the fiber 26 used in this embodiment. Accordingly, the excitation light 27 is absorbed by the laser active substance contained in the fiber 26 while propagating in a relatively wide area including a core of the fiber 26 and an inner clad. Further, the high-output excitation light 27 can be used since it can propagate in the wide area.

After being emitted from the second reflection surface 33, the fundamental wave 23 outputted from the fiber 26 in this way is converted into a parallel light by the condenser lens 32b and reaches the extraction mirror 30. A multilayer film 35 for wavelength selection is formed on one outer surface of the extraction mirror 30. Since this multilayer film 35 is formed to let a light having the wavelength of the excitation light 27 transmit through and to reflect a light having the wavelength of the fundamental wave 23, the fundamental wave 23 emitted from the second reflection surface 33 is reflected by the multilayer film 35 on the outer surface of the extraction mirror 30 to be introduced to the wavelength conversion element 25.

In this embodiment, it is preferable to construct the extraction mirror 30 by a narrow-band transmission filter and to insert the extraction mirror 30 to have an angle of, e.g. 40 to 500 to the excitation light 27. The insertion at an angle of 40 to 500 is for preventing a part of the excitation light 27 reflected by the extraction mirror 30 from returning to the laser light source 28. Further, since a light path of the light emitted from the filter 26 and that of the light emitted from the wavelength conversion element 25 can be made orthogonal to each other, the wavelength conversion element 25 can be more compact in the case of being formed into a module. Further, in addition to the extraction mirror 30, a narrow-band transmission filter may be inserted between the extraction mirror 30 and the collimator lens 32a.

By adopting such a construction, if the fiber 26 is, for example, an Yb-doped fiber, the transmission wavelength of the transmission filter can be conformed to absorption peak wavelengths of the Yb-doped fiber such as 915 nm and 976 nm. Further, the narrow bands give only a narrow wavelength bandwidth of 2 to 3 nm from the transmission wavelengths of 915 nm and 976 nm. When the excitation light 27 becomes such a light in the narrow band and is incident on the fiber 26 after transmitting through the extraction mirror 30, a part of the excitation light 27 is reflected by the second reflection surface 33 as the end surface of the fiber 26. This reflected part of the excitation light 27 propagates in an opposite direction along the light path to return to the laser light source 28, whereby the oscillation wavelength of the laser light source 28 is locked by the light in the narrow band, which is the returned part of the excitation light 27. The laser light source 28 for excitation originally has a relatively large wavelength bandwidth of 5 nm or longer since oscillating in the multimode, but becomes a laser light source having a narrow band whose wavelength bandwidth is 2 to 3 nm if an optical component is used to lock the wavelength of the transmission filter or the like in the narrow band as described above. By this effect, the wavelength bandwidth of the excitation light 27 becomes smaller to improve the efficiency of the laser light source 28 itself, and the excitation light 27 is more efficiently absorbed in the fiber laser 22 to realize even more efficient conversion of the light output from the excitation light 27 into the fundamental wave 23. Since the absorption efficiency of the excitation light 27 by the fiber 26 is high and the fiber length can be shortened in this embodiment, a fiber laser having higher efficiency can be produced if it is used upon producing a light having a wavelength equal to or below 1030 nm. At this time, the reflectance of the excitation light 27 by the second reflection surface 33 as the end surface of the fiber 26 is preferably set at least about 3 to 8%, and the emitter width of an excitation LD is preferably 50 to 200 μm, more preferably about 50 to 100 μm since wavelength locking is easier to perform with a smaller number of modes to be oscillated.

Next, the basic operation of the wavelength conversion element 25 is described. The laser light of the fundamental wave 23 is outputted from the fiber laser 22 as described above, and condensed by the condenser lens 36 to be incident on the wavelength conversion element 25. When this fundamental wave 23 from the fiber laser 22 becomes an incident wave and is converted by the nonlinear optical effect of the wavelength conversion element 25, it becomes the harmonic wave output 24 whose wavelength is half the wavelength of the fundamental wave 23. This converted harmonic wave output 24 is partly reflected by a beam splitter 37, but almost all the harmonic wave output 24 having transmitted through the beam splitter 37 is emitted as an output light of the wavelength converter 21.

Figure 8A:
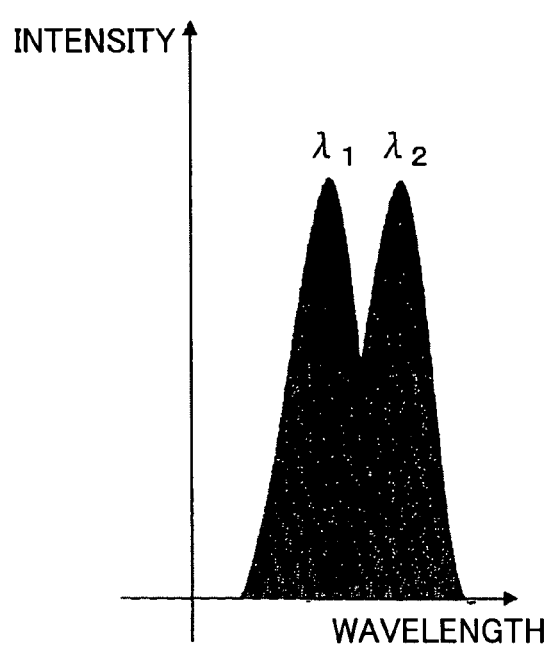
FIG. 8A is a graph showing an oscillation wavelength spectrum in the sixth embodiment of the invention.
Figure 8B:
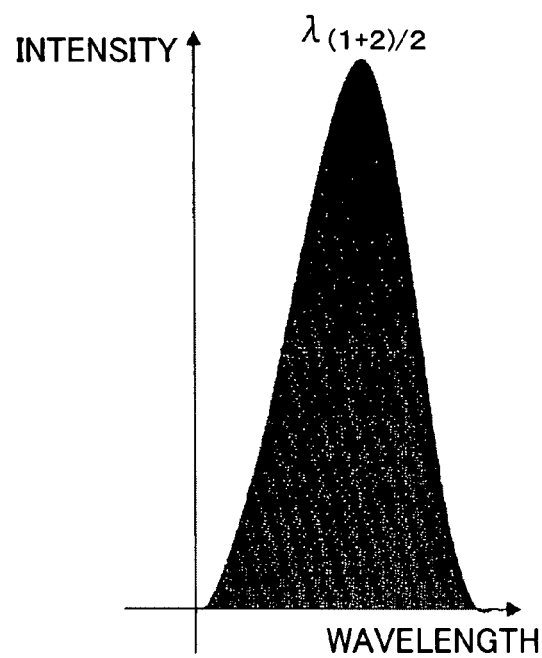
FIG. 8B is a graph showing an oscillation wavelength spectrum in a prior art.
Figure 8C:
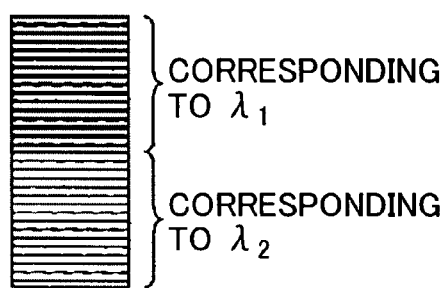
FIG. 8C is a pattern diagram showing the schematic structure of a wavelength conversion element capable of converting the oscillation spectrum of FIG. 8A.
Figure 8D:
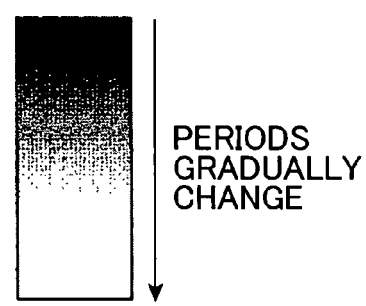
FIG. 8D is a pattern diagram showing the schematic structure of a wavelength conversion element capable of converting the oscillation spectrum of FIG. 8B.

FIG. 8A is a graph showing an oscillation spectrum of a laser light that can be generated by the fiber laser 22 of this embodiment, FIG. 8B shows an oscillation spectrum generated by a prior art, FIG. 8C shows the structure of a wavelength conversion element capable of converting the oscillation spectrum of FIG. 8A and FIG. 8D shows the construction of a wavelength conversion element capable of converting the oscillation spectrum of FIG. 8B.

In this embodiment, the wavelength conversion element 25 is so designed as to satisfy phase matching conditions corresponding to two peaks of the fundamental wave. In the case of this embodiment, polarization reversal periods forming the wavelength conversion element 25 are divided into two areas, one having periods corresponding to a fundamental wave having a wavelength $\lambda 1$ and the other having periods corresponding to a fundamental wave having a wavelength $\lambda 2$.

By forming the periods satisfying the phase matching conditions upon generating a sum frequency of the fundamental wave having the wavelength $\lambda 1$ and the fundamental wave having the wavelength $\lambda 2$ in the same wavelength conversion element, the shapes of the peaks in the wavelength spectrum of a second harmonic wave can be flattened. Conventionally, in order to efficiently convert a fundamental wave having a wide spectral width, the phase matching condition is gradually changed in the entire wavelength conversion element as shown in FIG. 8D, i.e. the polarization reversal periods need to be gradually changed in the case of a periodic polarization reversal element. Thus, only about ⅓ of the conversion efficiency could be obtained as compared to the case of converting a fundamental wave in a narrow band of about 0.1 nm. On the other hand, in the case of this embodiment, the respective fundamental waves can be efficiently converted by preparing the wavelength conversion element having optimal phase matching conditions for the respective fundamental waves having the wavelengths $\lambda 1$ and $\lambda 2$ as shown in FIG. 8C. The design of the wavelength conversion element of FIG. 8C is simple and can improve the wavelength conversion efficiency as described above.

The same effects as described above can be obtained by causing the wavelength conversion element to have a temperature gradient or by holding the areas corresponding to the respective peak wavelengths at the corresponding phase matching temperatures instead of designing the polarization reversal periods in conformity with the peaks of the respective fundamental waves.

A harmonic wave output 38 partly reflected by the beam splitter 37 is received by a light receiving element 39 for the monitoring of the output light of the wavelength converter 21 and utilized by being converted into an electrical signal. An output controller 40 adjusts a drive current for the laser light source 28 in a laser current source 41 for excitation so that the intensity of this converted signal can provide a desired output in the wavelength converter 21. Then, the intensity of the excitation light 27 from the laser light source 28 is adjusted, the output intensity of the fundamental wave 23 of the fiber laser 22 is adjusted and, as a result, the output intensity of the wavelength converter 21 is adjusted. In this way, the output intensity of the wavelength converter 21 is kept constant and a so-called automatic power control (hereinafter, abbreviated as "APC") stably operates.

In order to more accurately control the output intensity of the wavelength converter 21 by the APC operation, a light receiving element 42 may be arranged at an outer side of the first reflection surface 34 formed on the other end surface of the fiber 26. In this way, a tiny part of the fundamental wave 23 that leaks through the fiber grating 29 without being reflected thereby is detected. Further, a tiny part of the excitation light 27 that leaks through the first reflection surface 34 without being reflected thereby can be detected. By respectively presuming the total intensities of the excitation light 27 and the fundamental wave 23 based on these detection data, the output controller 40 performs the APC control operation for the output intensity of the wavelength converter 21 by adjusting the drive current for the laser light source 28 in the laser current source 41 for excitation. Similarly, by detecting a tiny part 44 of the excitation light 27 reflected by the other outer surface 43 of the extraction mirror 30 opposite to the one where the multilayer film 35 for reflecting the fundamental wave 23 is formed by means of a light receiving element 50, the output controller 40 can perform the APC operation by presuming the total intensity of the excitation light 27 from the part 44 of the excitation light 27.

Next, a specific operation of the wavelength converter 21 of FIG. 7 to emit a high-output green laser light (hereinafter, "G-light") is described.

In FIG. 7, a rare-earth element Yb is doped at a concentration of 1200 ppm as the laser active substance in the core part of the fiber 26 of the fiber laser 22. A semiconductor laser having a wavelength of 915 nm, a threshold current value of 400 mA and a maximum light output of 10 W is used as the excitation laser light source 28 for the fiber excitation. The excitation light 27 having a wavelength of 915 nm is incident on the fiber 26 and totally absorbed until reaching the second reflection surface 33 by being reflected by the first reflection surface 34 having a reflectance of 98% to make one round trip in the fiber 26. As a result, if the excitation light 27 from the laser light source 28 is incident on the fiber 26, it is absorbed in the core part and a stimulated emission of a light having a wavelength of about 1060 nm occurs from the fiber 26, utilizing the Yb level of the core part. A stimulated emission light having a wavelength of about 1060 nm propagates in the fiber 26 while being amplified with a gain obtained by the absorption of the excitation light 27 and becomes the fundamental wave 23 that is an infrared laser light having a wavelength of about 1060 nm.

Further, the fundamental wave 23 reciprocates between the reflection surfaces using the fiber grating 29 and the second reflection surface 33 as a pair of reflection surfaces of the laser cavity, whereby the oscillation wavelength is selected mainly by the fiber grating 29 having a higher reflectance. The reflection wavelength and reflection wavelength bandwidth of the fiber grating 29 at this time are set at 1064 nm and 0.1 nm. Accordingly, the wavelength bandwidth of the fundamental wave 23 becomes 0.1 nm and is outputted from the fiber laser 22. It should be noted that the reflectances of the fiber grating 29 and second reflection surface 33 of the fiber 26 when the wavelength of the fundamental wave 23 is 1064 nm are respectively set at 98% and 10%. A reflectance of 98% or higher could be realized in the narrow band having the wavelength bandwidth of 0.1 nm on one reflection surface of the laser cavity because the fiber grating 29 was used.

Figure 9:
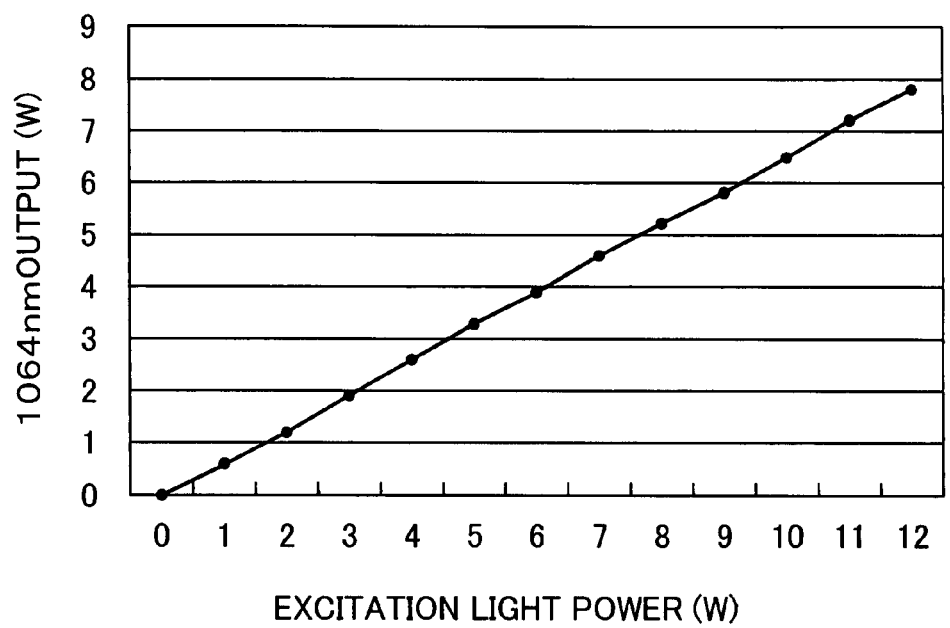
FIG. 9 is a graph showing an input-output characteristic of the light output of a fundamental wave in relation to an excitation light power of a laser light source for excitation.

FIG. 9 shows an input-output characteristic of the light output of the fundamental wave having a wavelength of 1064 nm in relation to an excitation light power of the laser light source 28 for excitation. It can be understood that the fundamental wave output linearly increases in proportion to the excitation light power of the laser light source 28 up to 8 W.

In order to obtain a high reflectance of reflecting the excitation light 27 by the first reflection surface 34 in this way, the multilayer film is formed on the end surface of the fiber 26. This multilayer film is made of, e.g. dielectric materials. Frequently used dielectric materials include $SiO_2$, $TiO_2$ and $Nb_2O_3$. The multilayer film is formed on the end surface of the fiber 26 by a sputtering method or evaporation method. From these materials, two are, for example, selected and laminated to cause a film to have a thickness that is ¼ of the wavelength of the excitation light 27 and a periodic multilayer structure, thereby forming the first reflection surface 34.

The reflectance of the second reflection surface 33 is set at 10% so that the fundamental wave 23 can be efficiently extracted as an incident light on the wavelength conversion element 25. The second reflection surface 33 of the fiber 26 may be formed by a polarization mirror in order to stabilize a polarization direction of the fundamental wave 23 and facilitate an optical adjustment of the polarization direction toward the wavelength conversion element 25. This polarization mirror can be realized by forming a thin film, which is, for example, a dielectric multilayer film of $SiO_2/HfO_2$, on the end surface of the fiber 26 and embossing the outer surface of the $HfO_2$ thin film to have stripe projections and recesses for the selective reflection of the polarization direction. If the second reflection surface 33 is a polarization mirror, it is preferable to design the second reflection surface 33 such that the reflectance thereof to reflect a light in a polarization direction desired to be oscillated becomes about 10 to 15% and the transmittance thereof to let lights in unnecessary polarization directions transmit therethrough becomes 99% or higher in order to construct a laser cavity having high efficiency and good polarization isolation. Further, the reflection band of this polarization mirror may be a wide band of 50 to 100 nm as compared to that of the fiber grating 29. By setting the reflectance to 10 to 20%, an unnecessary loss of the excitation light 27 to be incident on the fiber 26 caused by a sideband of the reflection spectrum can be reduced.

Figure 10:
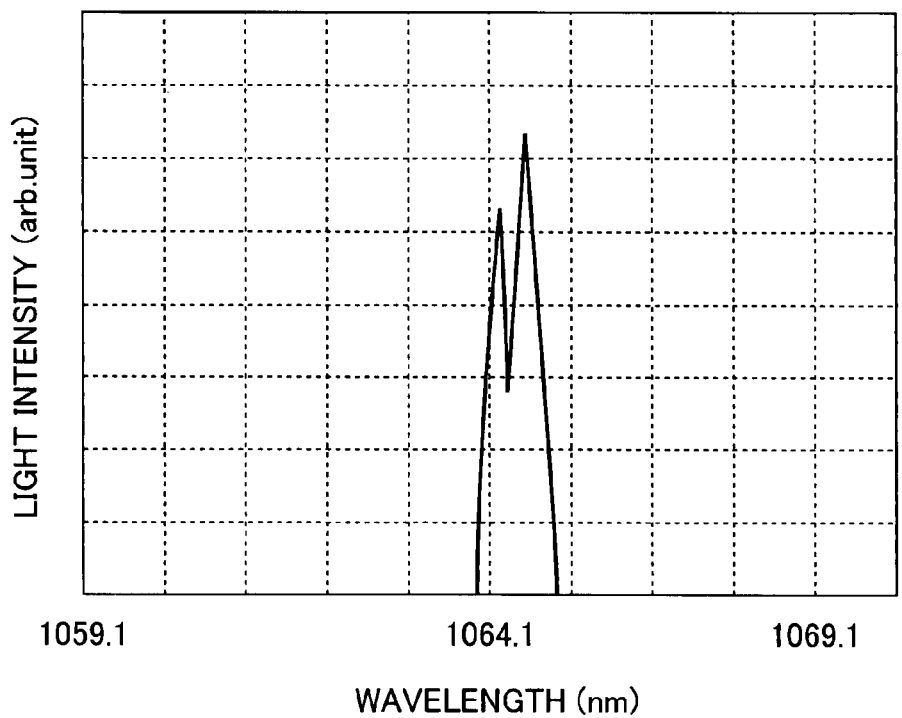
FIG. 10 is a graph showing an oscillation spectrum of a laser light generatable by a fiber laser according to a sixth embodiment of the invention.

FIG. 10 shows an oscillation spectrum of the fundamental wave in this embodiment. A laser light having two peaks distanced from each other by about 0.5 nm could be obtained.

Next, the process of converting the emitted fundamental wave 23 into the harmonic wave output 24 by the wavelength conversion element 25 is described.

The fundamental wave 23 having a wavelength of 1064 nm and outputted from the fiber laser 22 is incident on the wavelength conversion element 25 via the condenser lens 36. The wavelength conversion element 25 is an element for outputting the incident light while converting it into a second harmonic wave, and a periodic polarization reversal MgO:LiNbO$_3$ crystal having a length of 10 mm is used as such. Here, a wavelength at which conversion into a harmonic wave is possible in the wavelength conversion element 25 is called a phase matching wavelength and is set at 1064 nm at 25° C. in this embodiment. Accordingly, the wavelength 1064 nm of the fundamental wave 23 of the fiber laser 22 coincides with the phase matching wavelength, and the fundamental wave 23 is converted into the second harmonic wave in the wavelength conversion element 25 and becomes a green laser having a wavelength of 532 nm that is half the wavelength of the fundamental wave 23 to be outputted as the harmonic wave output 24 from the wavelength conversion element 25. Since the phase matching wavelength of the wavelength conversion element 25 generally sensitively changes according to the temperature of the element, a temperature control is performed with an accuracy of 0.01° C. Similar to the wavelength conversion element 25, the fiber grating 29 may be also temperature controlled with an accuracy of 0.01° C. in order to prevent a change in grating spacings due to a temperature increase when the fundamental wave 23 having a W-class output or higher is reflected.

In this embodiment, the wavelength conversion element 25 and the fiber grating 29 are individually temperature controlled with an accuracy of 0.01° C. by attaching Thermo-Electric elements 46, 47. By doing so, the harmonic wave output 24 in the form of a W-class green laser can be obtained even if the fundamental wave output of the fiber laser 22 exceeds 5 W to increase the heat generation of the wavelength conversion element 25 and the fiber grating 29. It should be noted that temperature sensors 48, 49 are attached to the Thermo-Electric elements 46, 47 and the readout of temperature signal outputs and the driving of the respective parts and elements are all controlled by the output controller 40 by connecting the Thermo-Electric elements 46, 47 and the temperature sensors 48, 49 to the output controller 40.

In the fiber laser 22 of this embodiment, the length of the fiber 26 is about half the length of the conventional one. This embodiment is designed such that the excitation light 27 is reflected by the first reflection surface 34 and completely absorbed while making one round trip in the fiber 26. By adopting the construction to reflect the excitation light 27 as in this embodiment, it becomes possible to make the length of the fiber 26 about half the length of the conventional one.

Figure 11:
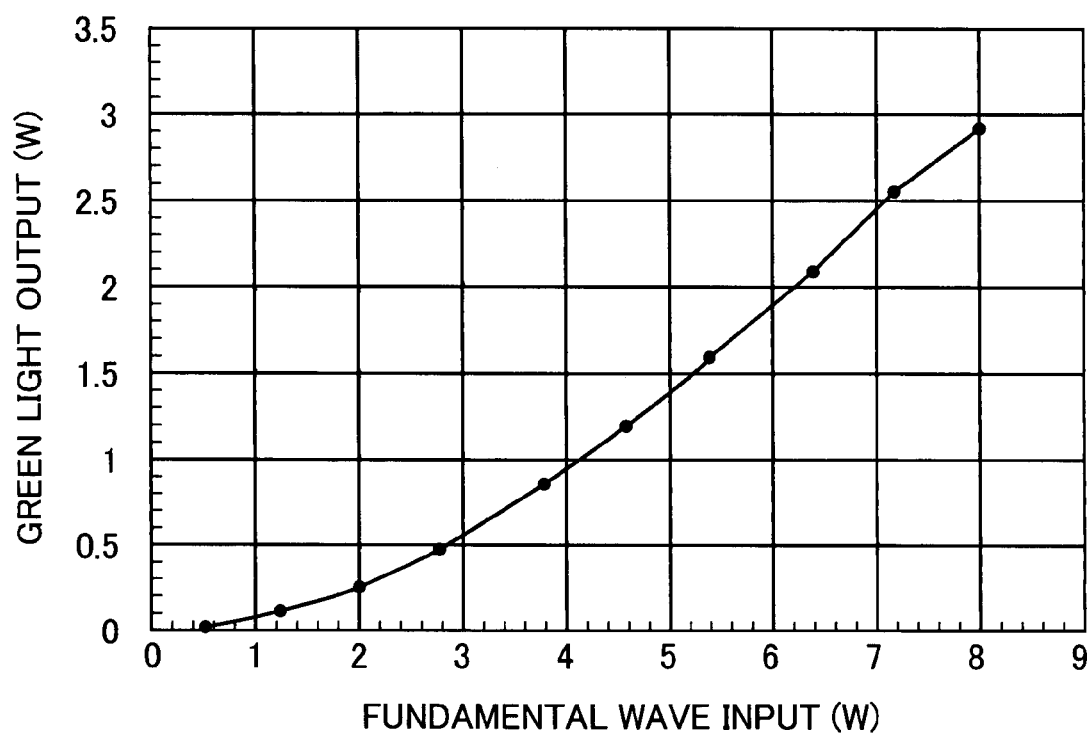
FIG. 11 is a graph showing an input-output characteristic of an output light (green light) of the harmonic wave in relation to an input light of the fundamental wave.

When the wavelength converter 21 of FIG. 7 was caused to operate, a G-light of 1.5 W was obtained when the fiber was excited by an excitation light having a light output of 9 W and a fundamental wave output was 6.3 W. The conversion efficiency of the G-light is thought to be significantly improved if the fundamental wave output is increased. FIG. 11 shows an input-output characteristic of a harmonic wave as an output light having a wavelength of 532 nm in relation to a fundamental wave as an input light having a wavelength of 1064 nm. It can be understood that the output light increases in proportion to the square of the input light.

Since the fiber laser of this embodiment can substantially completely absorb the excitation light using the fiber having half the length of the conventional one and the amplification interval of the fundamental wave is extended by adopting the construction described above, a uniformly high gain can be obtained to amplify the fundamental wave. Further, the fiber laser can have a compact construction, a high-output fundamental wave can be obtained and the wavelength converter can be miniaturized since the length of the fiber can be halved.

Further, the fiber laser of this embodiment can be constructed using the fiber having half the length of the conventional one. Accordingly, an absorbed amount of the fundamental wave by the fiber laser is halved and an absorbed amount at the short wavelength side where the light absorbed amount is large. Therefore, a high-output laser light of a fundamental wave having a wavelength of 1030 nm shorter than 1064 nm can be, for example, obtained.

Figure 12A:
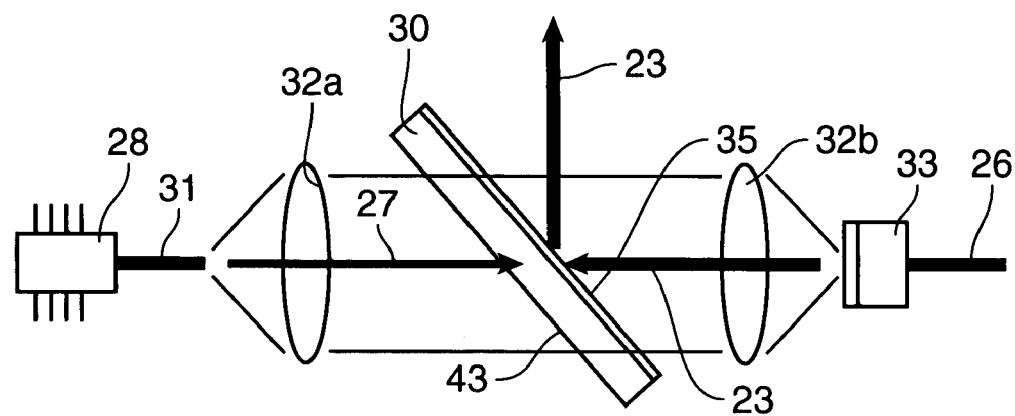
FIG. 12A is an enlarged view of an optical system for coupling the laser light source for excitation of the wavelength converter and a fiber in the sixth embodiment of the invention.

Next, the optical system coupling the laser light source 28 for excitation and the fiber 26 of the fiber laser 22 of FIG. 7 is described in detail. FIG. 12A is an enlarged view of the optical system of FIG. 7 and FIG. 12B is an enlarged view of the extraction mirror 30 of FIG. 7.

In FIG. 12A, the excitation light 27 emitted from the laser light source 28 for excitation via the fiber 31 belonging thereto transmits through the extraction mirror 30 after being converted into a parallel light by the collimator lens 32a. The excitation light 27 substantially entirely transmits through the extraction mirror 30 and is introduced to the fiber 26 by the condenser lens 32b. The incident excitation light 27 is completely absorbed while making one round trip in the fiber 26. The fiber 26 having a uniformly high gain for the fundamental wave amplifies the fundamental wave and outputs the fundamental wave 23 from the second reflection surface 33. The fundamental wave 23 is substantially entirely reflected by the multilayer film 35 formed on the outer surface of the extraction mirror 30 to be incident on the wavelength conversion element 25.

Figure 12B:
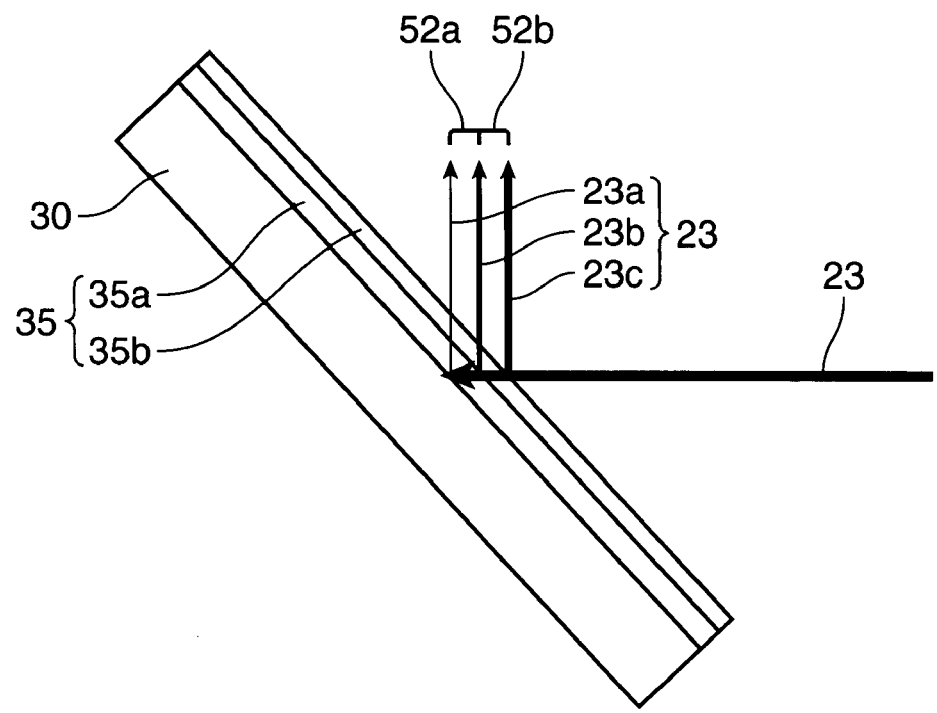
FIG. 12B is an enlarged view of an extraction mirror in an optical system of FIG. 12A.

FIG. 12B is the enlarged view of the extraction mirror 30. The fundamental wave 23 is incident on the extraction mirror 30 to be reflected by the multilayer film 35 on the outer surface of the extraction mirror 30. This multilayer film 35 is comprised of dielectric thin films 35a, 35b made of, e.g. $SiO_2$, $TiO_2$, $Nb_2O_3$ and/or like materials that little absorb the fundamental wave 23. Since distances 52a, 52b the fundamental wave 23 propagates in the multilayer film 35 are designed such that the phases of components 23a, 23b, 23c of the reflected fundamental wave 23 are aligned, the multilayer film 35 exhibits a high reflectance for the fundamental wave 23. If the extraction mirror 30 is arranged at an angle of 45° to the fundamental wave 23, the distances 52a, 52b correspond to half the wavelength of the fundamental wave 23. On the other hand, as described with reference to FIG. 12A, the extraction mirror 30 is designed to exhibit a high transmittance for the excitation light 27. Specifically, by forming the multilayer film 35 having a wavelength selecting property utilizing a wavelength difference between the wavelength 915 nm of the excitation light 27 and the wavelength 1064 nm of the fundamental wave 23 on the outer surface of the extraction mirror 30, the transmittance of the excitation light 27 and the reflectance of the fundamental wave 23 become higher to improve the efficiency of the entire wavelength converter. Further, since the fundamental wave 23 is substantially entirely reflected by the extraction mirror 30, it hardly reaches the laser light source 28 for excitation. Therefore, the damage of the laser light source 28 and the like is also prevented by the multilayer film 35 that is a wavelength selector.

Figure 13A:
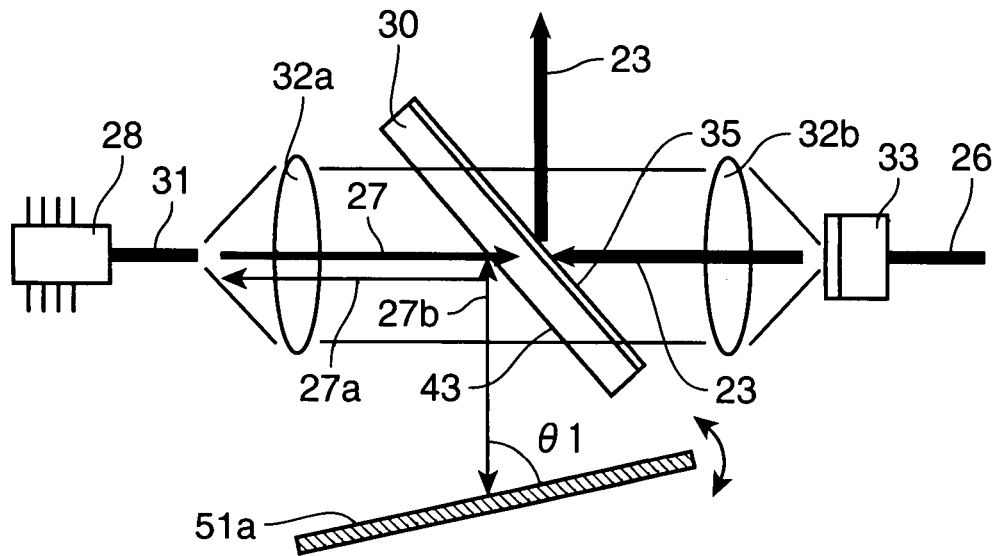
FIG. 13A is an enlarged view of an optical system for selecting the wavelength of the excitation light of the wavelength converter by a reflection-type diffraction grating in the sixth embodiment of the invention.
Figure 13B:
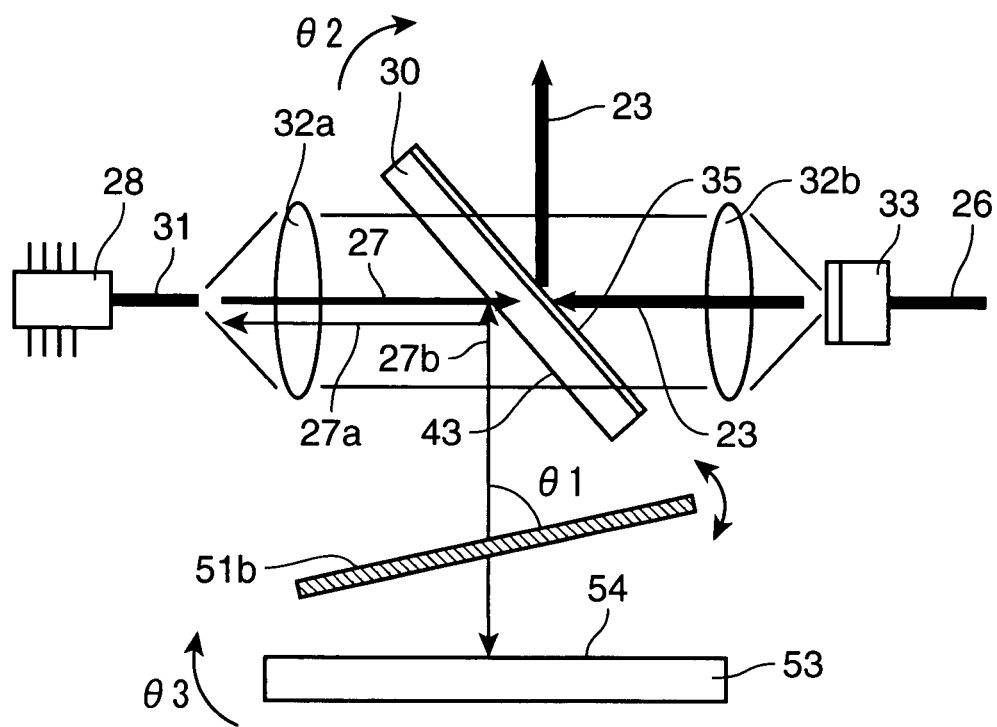
FIG. 13B is an enlarged view of an optical system for selecting the wavelength of the excitation light of the wavelength converter by a transmission-type diffraction grating in the sixth embodiment of the invention.

FIGS. 13A and 13B show construction examples for stabilizing the oscillation wavelength of the laser light source 28 for excitation of FIG. 7, wherein FIG. 13A shows the example utilizing a reflection-type diffraction grating and FIG. 13B shows the example utilizing a transmission-type diffraction grating.

As shown in FIG. 13A, the oscillation wavelength of the laser light source 28 for excitation can be stabilized by adding a reflection-type diffraction grating 51a to the optical system of FIG. 12A. A tiny part 27b of the excitation light 27 reflected by the extraction mirror 30 is introduced to the laser light source 28 by being returned as an excitation light 27a along the same path after having the wavelength selected with high accuracy in the diffraction grating 51a shown in FIG. 13A. By doing so, the wavelength selected with high accuracy in the diffraction grating 51a is amplified by the laser light source 28, whereby the wavelength of the excitation light 27 emitted from the laser light source 28 is fixed to the selected wavelength. Further, as described in the case of constructing the extraction mirror 30 as a transmission filter, the diffraction grating 51a not only functions to select the center wavelength, but also functions as a narrow-band filter. As shown in FIG. 13A, the wavelength selection of this excitation light 27 can be realized by arranging the diffraction grating 51a to rotationally adjust an angle θ1 to the excitation light 27b.

FIG. 13B shows the example for stabilizing the oscillation wavelength of the laser light source 28 for excitation by using a transmission-type diffraction grating 51b and a reflection mirror 53 instead of the reflection-type diffraction grating 51a of FIG. 13A. The tiny part 27b of the excitation light 27 reflected by the extraction mirror 30 is reflected by a reflection surface 54 of the reflection mirror 53 after having the wavelength selected with high accuracy in the diffraction grating 51b shown in FIG. 13B and transmitting through the diffraction grating 51b. The reflected excitation light 27b is introduced to the laser light source 28 by being returned as the excitation light 27*a* along the same path. By doing so, the wavelength selected with high accuracy in the diffraction grating 51*b* is amplified by the laser light source 28, whereby the wavelength of the excitation light 27 emitted from the laser light source 28 is fixed to the selected wavelength. Further, as described in the case of constructing the extraction mirror 30 as a transmission filter, the diffraction grating 51*b* not only functions to select the center wavelength, but also functions as a narrow-band filter.

The extraction mirror 30 causes the fundamental wave 23 to be incident on an incident surface at an angle of 80°. This is because a return light is created if the fundamental wave 23 is perfectly perpendicular to the incident surface. 80% or higher of the transmitted light is obtained at the peaks of the fundamental wave 23. The transmission wavelength of the extraction mirror 30 has a wavelength bandwidth of 2 to 3 nm with 975 nm as a center. After the transmission of a part of the excitation light from the laser light source 28 having specified wavelengths, the fundamental wave 23 reflected at the end surface of the fiber 26 toward the fiber grating 29 propagates in an opposite direction along the same light path to be returned to the laser light source 28, whereby the wavelength of the laser light source 28 is locked. Although the laser light source 28 has a wavelength bandwidth of 5 nm or longer since being of the multimode, the wavelength bandwidth is narrowed to 2 to 3 nm by the wavelength locking by means of the filter and the grating. Thus, the electro-light efficiency of the fiber laser 22 can be improved. At this time, about 3 to 5% of the excitation light is preferably reflected by the end surface of the fiber 26 as the first reflection surface 34.

As compared to the construction of FIG. 13A, a center wavelength selection range is wider in the construction of FIG. 13B since the transmission-type diffraction grating 51*b* is used. Further, it can be independently performed to selectively control an emission direction of the fundamental wave 23 by rotating the extraction mirror 30 and to select the wavelength of the excitation light 27. Specifically, if the emission direction of the fundamental wave 23 is selected by rotating the extraction mirror 30 only by θ2 in FIG. 13B, the diffraction grating 51*b* and the reflection mirror 53 rotate together by θ3. However, the wavelength of the excitation light 27 is selected by selecting the angle θ1 of the diffraction grating 51*b* to the excitation light 27 independently of the above rotations by θ2 and θ3.

If the construction of FIG. 13A or 13B is utilized as above, a wavelength having a larger absorbed amount by the fiber can be used as the wavelength of the laser light source 28 of FIG. 7, for example, in an absorption spectrum of the Yb-doped fiber used as the fiber laser in this embodiment. Specifically, there can be used an excitation light with a wavelength of 976 nm having three times or more as large an absorbed amount as the wavelength 915 nm used in this embodiment. Although the absorption spectrum at 976 nm has a narrower wavelength band as compared to 915 nm, it can be sufficiently used by selecting the wavelength of the diffraction grating 51*a* or 51*b* shown in FIG. 13A or 13B with high accuracy to fix the oscillation wavelength of the excitation light 27 from the laser light source 28. When the excitation light 27 having a wavelength of 976 nm was used in the wavelength converter 21 of the construction shown in FIG. 7, it was confirmed that the G-light output, which had been 1.5 W, became 2.5 W with an excitation light of 9 W having a wavelength of 915 nm and the G-light as the harmonic wave output 24 could be obtained with higher efficiency.

Figure 14:
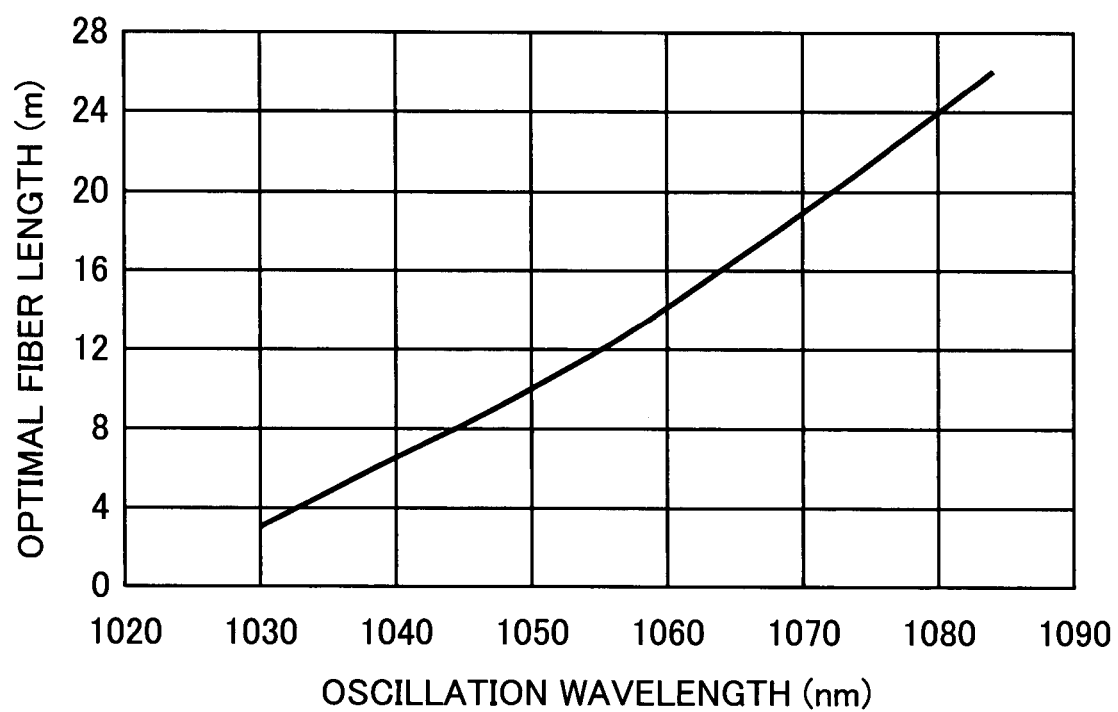
FIG. 14 is a graph showing an optimal fiber length in relation to the oscillation wavelength of a conventional fiber laser in a conventional wavelength converter.

FIG. 14 shows an optimal fiber length in relation to the oscillation wavelength of the fiber laser 22. As is clear from FIG. 14, the absorbed amount of the fundamental wave 23 increases and, thus, the optical fiber length becomes shorter as the oscillation wavelength of the fundamental wave 23 of the fiber laser 22 becomes shorter. Thus, the interval during which the seed light of the fundamental wave is amplified is shortened, and it has been difficult to obtain a high-output fundamental wave. However, in this embodiment, the optimal fiber length is shortened by reflecting the excitation light, thereby suppressing a loss of the fundamental wave and improving the output of the fundamental wave. Thus, a W-class high-output G-light can be obtained with a shorter fiber length than before, wherefore the construction of this embodiment is suitable for the generation of a G-light having a shorter wavelength than the conventional G-light.

Accordingly, a higher output of 5 W or more can be obtained with a fundamental wave having a shorter wavelength than the fundamental wave used in this embodiment by adjusting the kind and amount of the rare earth element doped in the fiber and adjusting the reflection wavelength of the fiber grating to a shorter one. Therefore, a W-class green laser light having a shorter wavelength of 510 to 540 nm can be obtained by a similar construction.

Since a green laser light having a shorter wavelength of 510 to 540 nm can be obtained and the range of reproduced colors can be more expanded than the conventional sRGB standard by shortening the fiber length of the fiber laser. Therefore, the color reproduction range can be further expanded upon application to a display or the like.

In this embodiment, the extraction mirror 30 is provided in the optical system 200 of FIG. 7 to cause the excitation light 27 from the laser light source 28 to propagate straight to be incident on the fiber 26 while causing the fundamental wave 23 from the fiber 26 to emit in the direction substantially normal to the light path between the laser light source 28 and the fiber 26, whereby the fundamental wave 23 is extracted from the fiber laser 22. However, this embodiment is not limited to the construction of this optical system 200. In other words, it does not matter which construction the optical system has provided that the optical system can change the emission direction of the fundamental wave 23 from the fiber 26 in such a manner as to avoid the coincidence with the light path between the laser light source 28 and the fiber 26 and to emit the fundamental wave 23 to the wavelength conversion element 25 without letting the fundamental wave 23 return to the laser light source 28.

Seventh Embodiment

Figure 15:
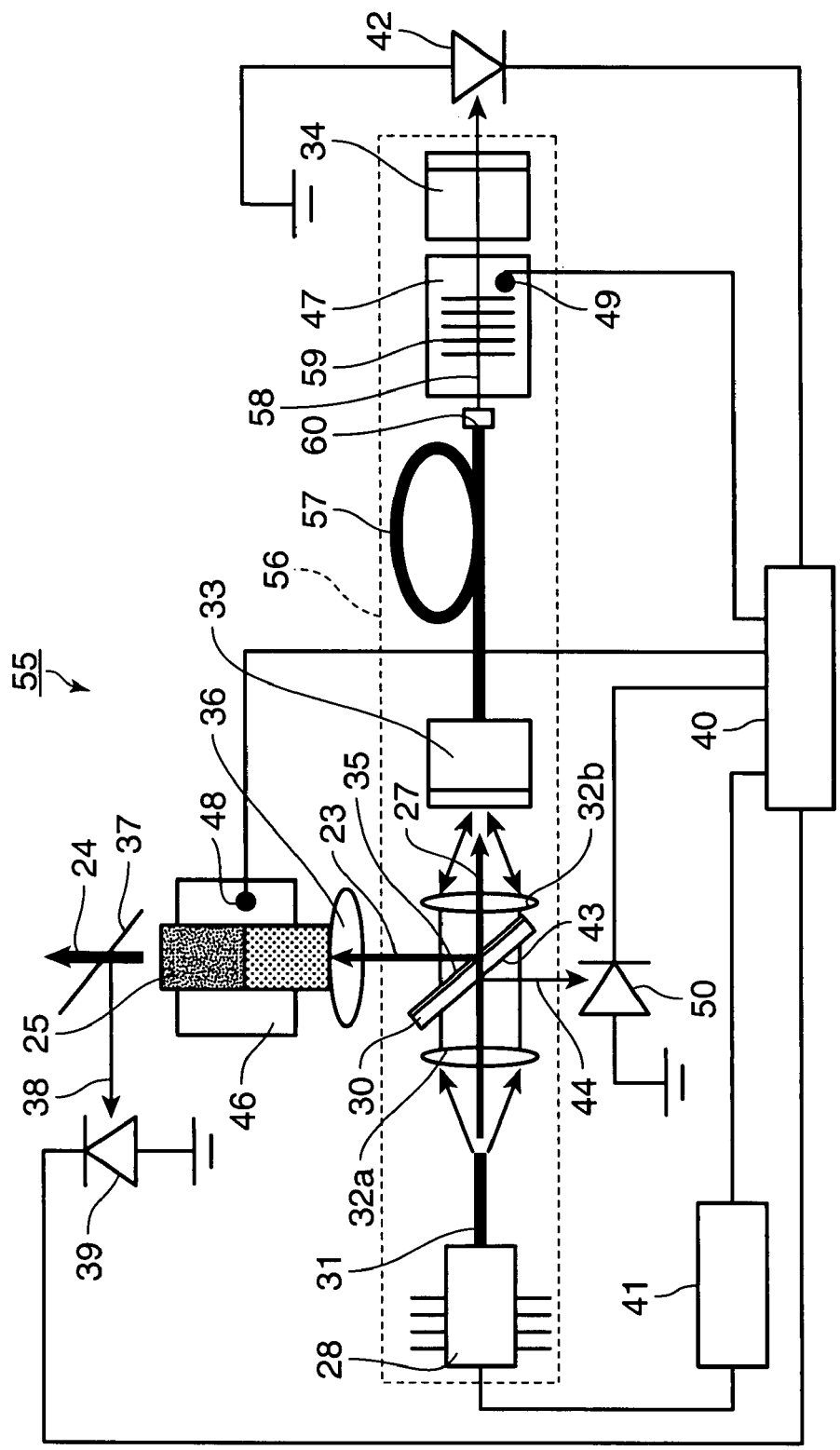
FIG. 15 is a schematic diagram showing the construction of a wavelength converter according to a seventh embodiment.

FIG. 15 shows the construction of a wavelength converter according to a seventh embodiment of the present invention. Similar to the sixth embodiment, a wavelength converter 55 of this embodiment is provided with a fiber laser 56, a wavelength conversion element 25 for converting a fundamental wave 23 emitted from the fiber laser 56 into a harmonic wave output 24, and a condenser lens 36 arranged between the fiber laser 56 and the wavelength conversion element 25 as a basic construction. This embodiment differs from the sixth embodiment in that the fiber laser 56 is not comprised of a single fiber, but comprised of a first fiber 57 containing a laser active substance, a second fiber 58 having a fiber grating 59 formed inside and a connecting portion 60 connecting the first and second fibers 57, 58.

By adopting such a construction, the first fiber 57 can be produced using an optimal amount of an optimal material as the laser active substance so as to be able to efficiently absorb an excitation light 27. Further, the second fiber 58 can be selected to have such a construction with which the fiber grating 59 and a first extraction mirror 34 can be easily formed.

Here, a double-clad polarization maintaining fiber is, for example, used as the first fiber 57, and a rare-earth element Yb is doped as the laser active substance into a core part at a concentration of 1320 ppm, thereby increasing an absorbed amount of the excitation light 27 per unit length. Thus, the length of the fiber is shortened by about 10% as compared to the construction of FIG. 7. By maintaining a total amount of gains for amplifying the fundamental wave 23 to shorten the length of the fiber, the absorbed amount of the fundamental wave 23 by the fiber laser 56 is decreased so that the fundamental wave 23 having a shorter wavelength can also be outputted.

On the other hand, the second fiber 58 is not doped with any rare-earth element to decrease the absorption of the excitation light 27 in the second fiber 58, whereby the conversion efficiency of the excitation light 27 into the fundamental wave 23 in the entire fiber laser 56 is improved. The material and construction of the second fiber 58 are suitably selected so that the fiber grating 59 can be produced with the reflection wavelength and the wavelength bandwidth thereof set with high accuracy. Using the fiber laser 56 having the above construction, a W-class G-light could be obtained from the wavelength converter 55 as in the sixth embodiment.

Since the first and second fibers 57, 58 are double-clad fibers in this embodiment, the fiber deterioration caused in a connected part between the double-clad fiber and the single-mode fiber as shown in the prior art of FIG. 21 can be prevented, wherefore the reliability of the fiber laser and the wavelength converter can be improved.

Further, since the fiber is divided into a plurality of parts and the respective fiber parts are made of the optimal materials to have the optimal constructions, the length of the fiber can be further shortened. Thus, a green laser light having a short wavelength of 510 to 540 nm can be obtained and the range of reproduced colors can be more expanded than the conventional sRGB standard by shortening the fiber length of the fiber laser. Therefore, the color reproduction range can be further expanded upon application to a display and the like.

Eighth Embodiment

Figure 16:
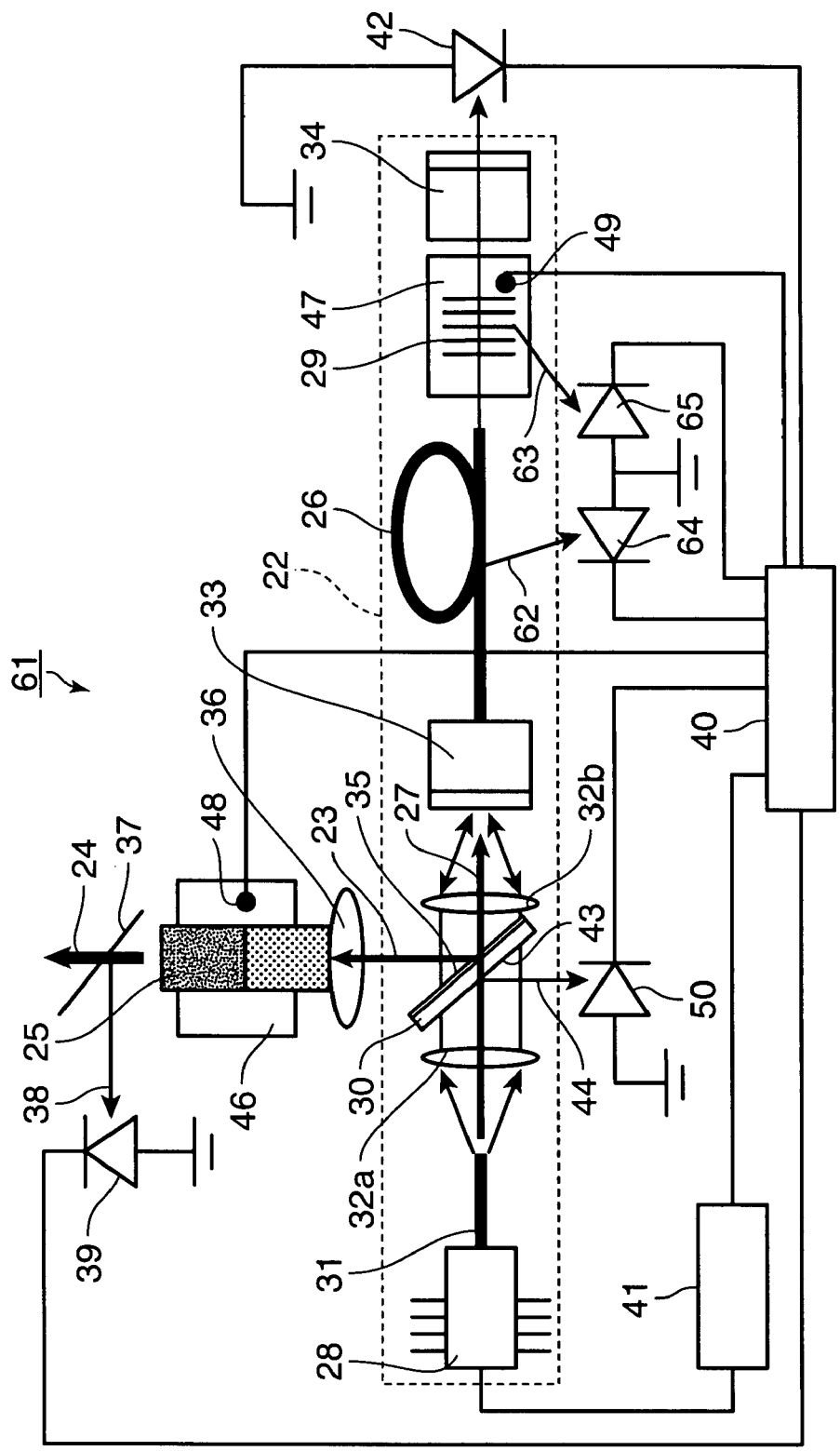
FIG. 16 is a schematic diagram showing the construction of a wavelength converter according to an eighth embodiment.

FIG. 16 shows the construction of a wavelength converter according to an eighth embodiment of the present invention. In this embodiment, a wavelength converter 61 of FIG. 16 can, as a whole, control a laser output after the wavelength conversion based on a data inputted beforehand. This embodiment has the same construction as the sixth embodiment shown in FIG. 7 except that many light receiving elements are arranged to detect light amounts of an excitation light 27, a fundamental wave 23 and a harmonic wave output 24 and connected to an output controller 40.

In the wavelength converter 61 of FIG. 16, the harmonic wave output 24 is detected by having a part 38 thereof detected by a light receiving element 39. Further, the fundamental wave 23 is detected by having a light leaking from a first extraction mirror 34 of a fiber laser 22, a part 62 thereof leaking from a processed part of the fiber 26 and a part 63 thereof dispersed by a fiber grating 29 detected by any one of light receiving elements 42, 64 and 65. Further, the excitation light 27 is detected by having a tiny part thereof reflected by an extraction mirror 30 detected by a light receiving element 50 or by having a tiny part thereof transmitting through a first extraction mirror 34 detected by the light receiving element 42. These light receiving elements 39, 42, 50, 64 and 65 are all connected to the output controller 40. Further, Thermo-Electric elements 46, 47 and temperature sensors 48, 49 arranged for the temperature control of the wavelength conversion element 25 and the fiber grating 29 are also connected to the output controller 40. The output controller 40 grasps the overall status of the wavelength converter 61 in accordance with signals from the respective light receiving elements 39, 42, 50, 64 and 65 and the temperature controlling/detecting elements and stably outputs a desired harmonic wave output 24 by controlling these elements and a laser current source 41. For example, the output controller 40 operates as an output controlling section so as to minimize a current value of a laser light source 28 for excitation as an input and to maximize the harmonic wave output 24 as an output based on detection signals from the respective light receiving elements 39, 42, 50, 64 and 65 and the table data inputted beforehand.

Typical data inputted in a table format and contained include a phase matching wavelength variation and a reflection wavelength variation in the fiber grating 29 in the wavelength conversion element 25 in relation to the fundamental wave output 23. Since the temperature dependencies of the wavelength variations of the wavelength conversion element 25 and the fiber grating 29 are respectively 0.05 nm/K and 0.01 nm/K, the temperature increases of the wavelength conversion element 25 and the fiber grating 29 are estimated based on these numerical values. The conversion efficiency of the fundamental wave 23 into the harmonic wave output 24 is maximized by conforming the wavelength of the fundamental wave 23 to the phase matching wavelength of the wavelength conversion element 25 based on these data. To this end, a heat radiating fin is attached to the wavelength conversion element 25 beforehand, has a temperature increase thereof maximally suppressed by this fin and is cooled by the Thermo-Electric element 46 to suppress the temperature increase, thereby being constantly controlled to be at room temperature, e.g. around 25° C. On the other hand, since the wavelength of the fundamental wave 23 is determined by the reflection wavelength of the fiber grating 29, the fiber grating 29 is heated or cooled by the Thermo-Electric element 47 to change the grating spacing, thereby changing the reflection wavelength. In this way, the wavelength of the fundamental wave 23 is adjusted to conform to the phase matching wavelength of the wavelength conversion element 25 at that moment. Since a physical quantity for improving the output efficiency of the wavelength converter 61 is controlled by the output controller in this way, the output of the fundamental wave 23 is efficiently converted into the second harmonic wave in the wavelength conversion element 25 to generate a W-class G-light having a wavelength of 532 nm, for example, if an infrared light having a wavelength of 1064 nm is used as a fundamental wave.

Ninth Embodiment

Figure 17:
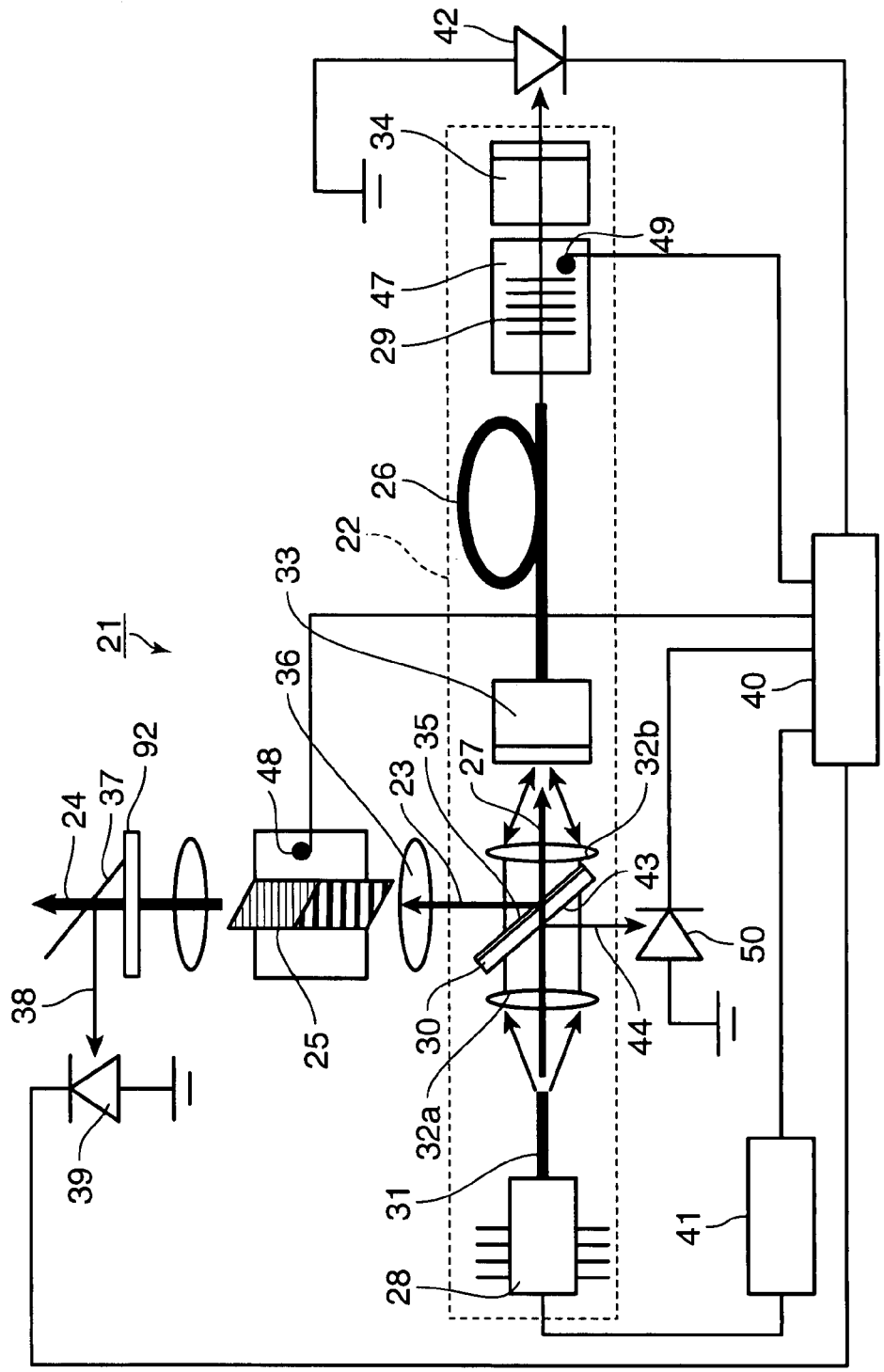
FIG. 17 is a schematic diagram showing the construction of a wavelength converter according to a ninth embodiment.

FIG. 17 shows the construction of a wavelength converter according to a ninth embodiment of the present invention. In this embodiment, a wavelength converter having higher efficiency can be realized by arranging a wavelength conversion element 25 in a laser cavity. In the case of the construction of FIG. 17, a fiber laser cavity is constructed by a fiber grating 29 and a third reflection surface 92. Since the light power density of a fundamental wave increases in this cavity, more efficient wavelength conversion can be realized if the wavelength conversion element 25 is arranged in the cavity. In this case, a fundamental wave in the form of a single polarized light can be obtained by setting a crystal end surface at a Brewster angle without setting the fiber end surface 33 at a Brewster angle.

In this case, the third reflection surface 92 preferably has a reflectance of 98% or higher to reflect the laser light of the fundamental wave and a reflectance of 1% or lower to reflect the wavelength-converted second harmonic wave. By setting the reflectance of reflecting the fundamental wave at 98%, the generation of a giant pulse caused by inadvertent reflection by the end surfaces of the wavelength conversion element and optical components such as lenses can be prevented, whereby the reliability of the wavelength converter can be improved.

In addition, more efficient wavelength conversion is possible in the case of generating a sum frequency of the fundamental wave having the wavelength $\lambda 1$ and the fundamental wave having the wavelength $\lambda 2$ by arranging the wavelength conversion element 25 in the cavity.

Tenth Embodiment

Figure 18A:
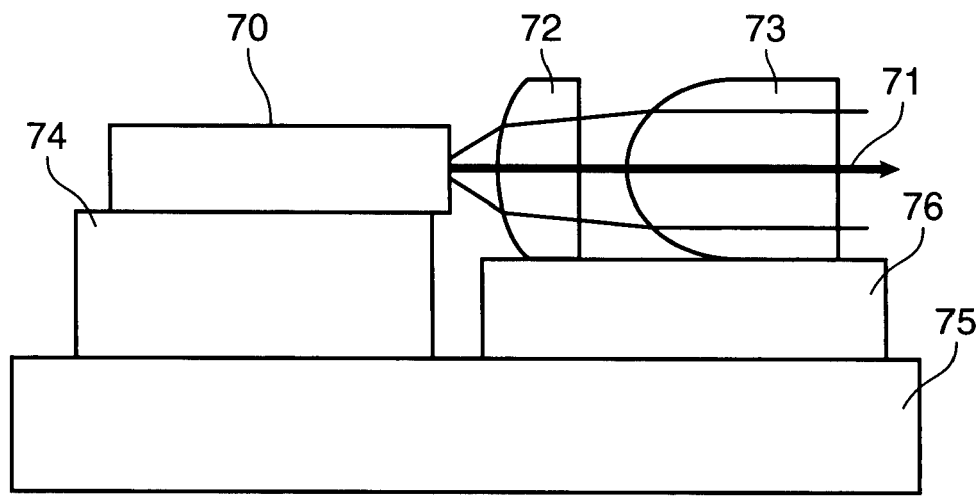
FIG. 18A is a diagram of a construction in the case of beam shaping by means of a cylindrical lens.
Figure 18B:
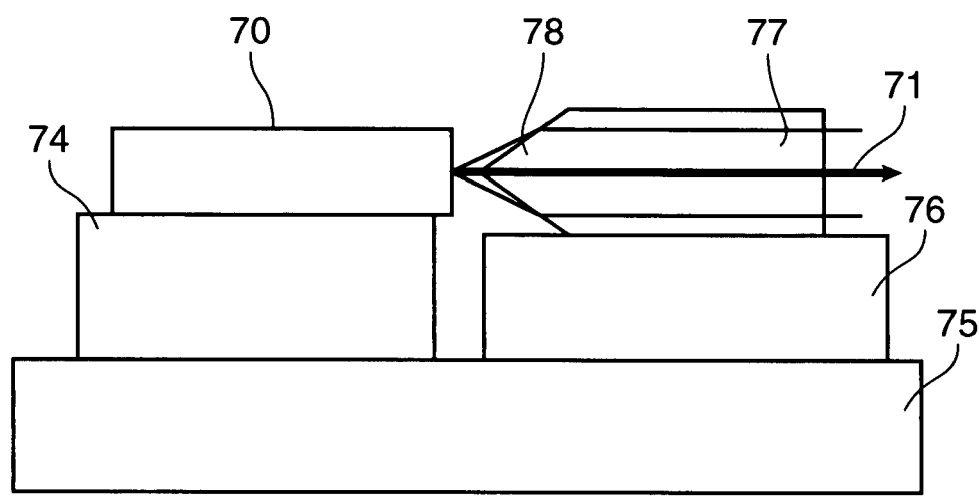
FIG. 18B is a diagram of a construction in the case of beam shaping by means of a lens fiber.

FIGS. 18A and 18B show the construction of a laser light source for excitation used in a wavelength converter according to a tenth embodiment of the present invention. In the above sixth to ninth embodiments, the laser light source for excitation is a general pigtail laser light source provided with a fiber for guiding an excitation light to the outside. The use of such a laser light source makes it difficult to miniaturize an optical system to be coupled to a fiber laser. In order to miniaturize such an optical system, it is necessary to arrange the optical system very close to a laser chip for excitation.

FIGS. 18A and 18B show a miniaturized optical system in which a small-size optical component is arranged very close to a laser chip for excitation to couple an excitation light 71 to a fiber laser as a parallel beam having a beam diameter of several tens μm. A divergent angle of the excitation light 71 emitted from the laser chip for excitation depends on a laser construction. Since this laser is a waveguide semiconductor laser, the divergent angle is about 10° in a horizontal direction parallel to a waveguide and about 30° in a direction vertical to the waveguide. Accordingly, an aspect ratio of the horizontal to vertical directions is about 2 to 4. Unless this aspect ratio is improved to become approximately 1, the laser light cannot be efficiently introduced into the optical system upon being coupled to the fiber, thereby causing a loss of a light amount.

In order to improve the aspect ratio, the laser beam of the excitation light 71 emitted from the laser chip 70 may be shaped. As an exemplary beam shaping, FIG. 18A shows an example using a cylindrical lens 72. It can be seen in FIG. 18A that the divergent angle of the excitation light 71 emitted from the laser chip 70 in the vertical direction is narrowed by the cylindrical lens 72 for narrowing a beam in the vertical direction. This shaped excitation light 71 is converted into a parallel light by a collimator lens 73 without losing the light amount thereof in the vertical and horizontal directions. At this time, the laser chip 70 is soldered to a submount 74 having a good heat radiation property, e.g. made of AlN, and this submount 74 is bonded to a metal base 75 using Au paste having high heat conductivity. In other words, heat generated by the laser chip 70 is efficiently radiated to a package and a casing by means of the submount 74 and the like having good heat conductivity, thereby suppressing a temperature increase caused by the heat generation of the laser chip 70. Further, the cylindrical lens 72 and the collimator lens 73 are supported by an insulating holder 76, which is fixed to the metal base 75 by adhesive.

FIG. 18B shows another example in which the beam shaping is performed by a lens fiber 77 provided with a cylindrical lens function. It can be seen in FIG. 18B that the divergent angle of the excitation light 71 emitted from the laser chip 70 in the vertical direction is narrowed by the lens fiber 77 provided with the cylindrical lens function for narrowing a beam in the vertical direction. The excitation light 71 shaped by a tapered leading end 78 of this lens fiber 77 is collimated by a main part of the lens fiber 77 to be converted into a parallel light without losing any light amount. At this time, similar to FIG. 18A, the laser chip 70 is soldered to the submount 74 having a good heat radiation property, e.g. made of AlN, and this submount 74 is bonded to the metal base 75 using Au paste having high heat conductivity. Further, the lens fiber 77 is supported by the insulating holder 76, which is fixed to the metal base 75 by adhesive.

Since an optical element can be closely arranged at a short distance of several mm to the laser chip 70 shown in FIGS. 18A and 18B in this way, the laser chip 70 and the optical system can be compactly contained in a small-size package fitted with the metal base having a good heat radiation property. A metal container of the package at this time may be used as the metal base. Further, the package needs to be shielded from the outside at least for dust proofing, e.g. by means of a metal cap fitted with a transparent glass. At this time, by purging the inside of the package in a nitrogen atmosphere containing about 5% of hydrogen, carbon generation caused by the burning of dust in the package by a laser beam can be suppressed.

Figure 19:
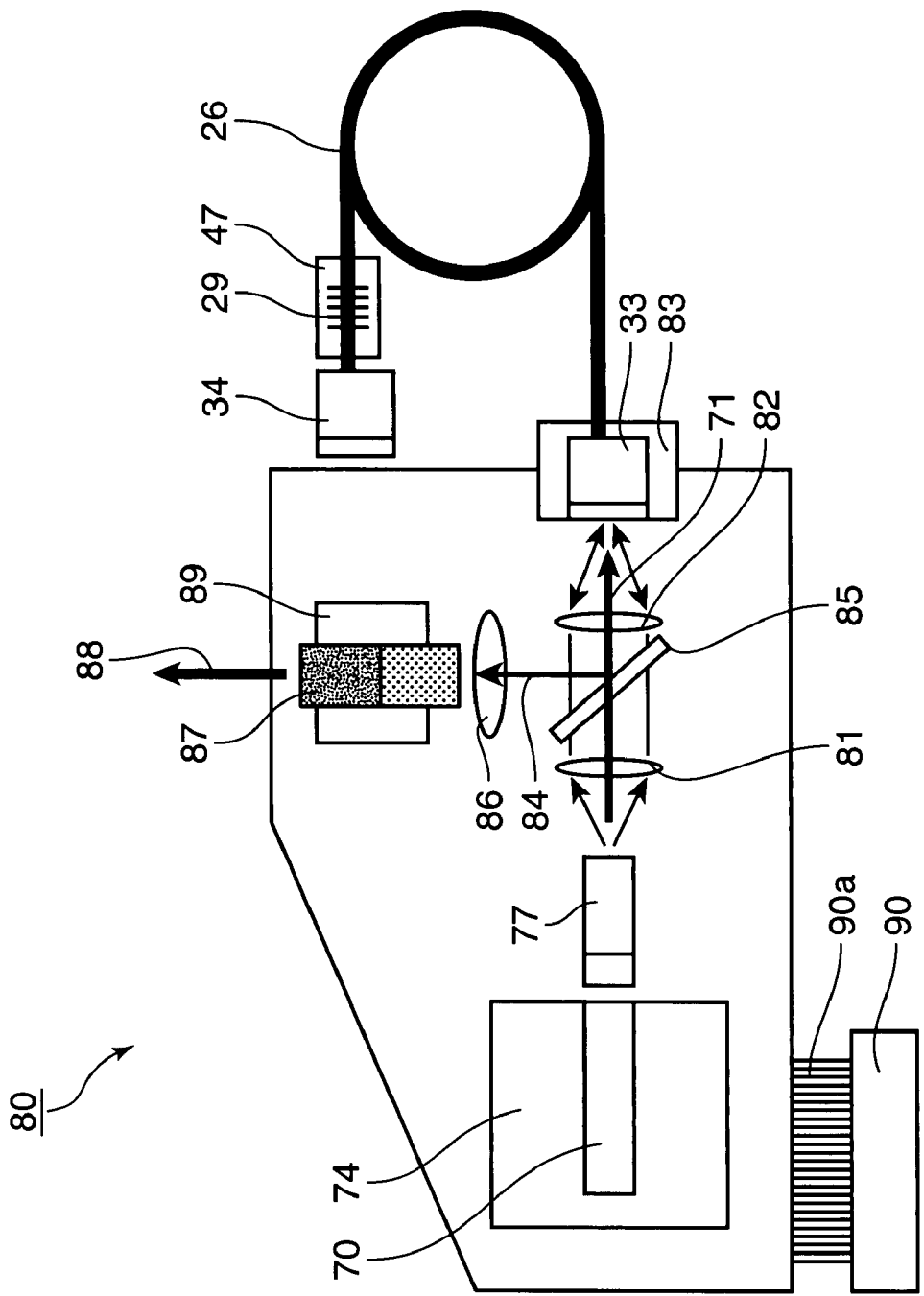
FIG. 19 is a diagram showing the construction of a wavelength converter according to a tenth embodiment of the invention in the form of a module.

Further, as shown in FIG. 19, the laser light source for excitation shown in FIG. 18A or 18B may be compactly contained in the same casing as a module further including an optical system for coupling to the fiber and a wavelength conversion element.

FIG. 19 is a diagram showing the internal construction of a module 80 when viewed from above. The followings are mainly arranged in the module 80. An excitation light 71 is shaped, for example, by a lens fiber 77 to be converted into a parallel light after being emitted from a laser chip 70. This excitation light 71 is condensed by a condenser lens 82 to be incident on a fiber 26 after transmitting through a collimator lens 81 from the lens fiber 77. At this time, the fiber 26 including a second reflection surface 33 is fixed by a fiber holder 83 provided in the module 80. A fundamental wave 84 having undergone laser oscillation in the fiber 26 transmits through the condenser lens 82 after being emitted from the second reflection surface 33 of the fiber 26, and is condensed by the condenser lens 86 to be incident on a wavelength conversion element 87 and converted into a harmonic wave output 88 after being reflected by an extraction mirror 85. This harmonic wave output 88 becomes an output of the module 80. A fin (not shown) for cooling is attached to the wavelength conversion element 87 and, in addition, a Thermo-Electric element 89 for temperature adjustments is attached thereto. Further, a fan (not shown) for cooling the Thermo-Electric element 89 cooling the laser chip 70 and the wavelength conversion element 87 is mounted in the module 80. It should be noted that elements and components in the module 80 can be controlled by a module controller 90 via input-output lines 90a.

By closely arranging the laser chip and the lens in the casing in this way, the laser light source can have a compact construction. Further, since things other than the fiber can be compactly formed into the module as shown in FIG. 19, the miniaturization and weight saving of the wavelength converter can be realized and the entire module can be exchanged at the time of a trouble. Thus, complicated optical adjustments can be simplified and the inside of the module can be cleanly maintained. Therefore, it becomes possible to prevent the adherence of dust to the wavelength conversion element 87 and the optical system such as the lens caused by laser trapping and reliability can be further improved.

Although the arrangement of the light receiving elements, temperature sensors and Thermo-Electric elements is not sufficiently shown here, necessary numbers of these elements may be arranged at necessary positions as in the eighth embodiment shown in FIG. 16.

Although an output controller, a laser current source for excitation and the like are not shown here, all the parts and devices necessary for the wavelength converter are arranged and the wavelength converter is entirely controlled by the output controller.

Although the excitation light of the laser for excitation is shaped using the cylindrical lens or the lens fiber in this embodiment, another optical component capable of beam shaping such as a beam shaping prism or a concave lens may be used.

Eleventh Embodiment

Figure 20:
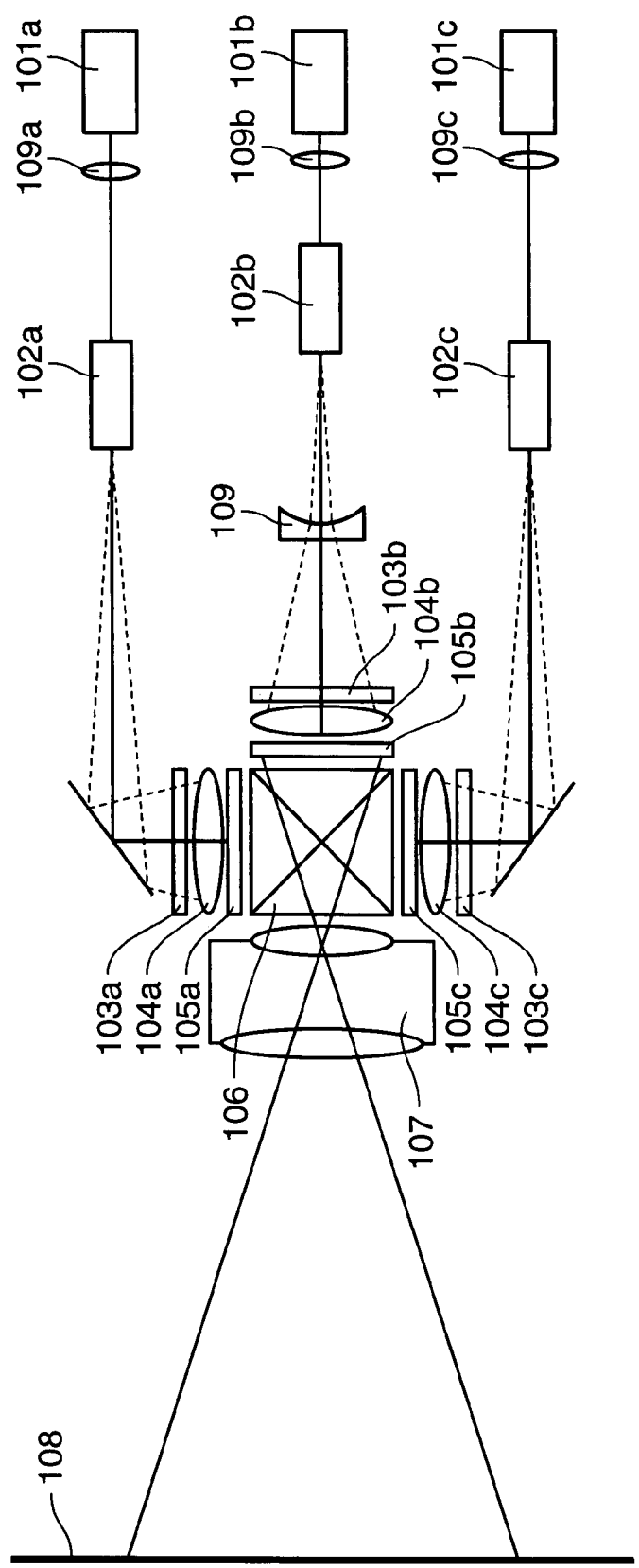
FIG. 20 is a schematic diagram showing the construction of a two-dimensional image display device according to an eleventh embodiment of the invention.

FIG. 20 shows an exemplary construction of a laser display (two-dimensional image display device) according to an eleventh embodiment of the present invention using the wavelength converter according to any one of the sixth to tenth embodiments. Three color laser light sources 101a, 101b and 101c of red (R), green (G) and blue (B) are used as light sources. An AlGaInP/GaAs semiconductor laser having a wavelength of 638 nm is used as the red laser light source (R light source) 101a and a GaN semiconductor laser having a wavelength of 465 nm is used as the blue laser light source (B light source) 101c.

On the other hand, the wavelength converter according to any one of the sixth to tenth embodiments including a wavelength conversion element for halving the wavelength of an infrared laser is used as the green laser light source (G light source) 101b. Laser beams emitted from the respective R, G, B light sources 101a to 101c are caused to scan diffusers 103a to 103c by reflection-type two-dimensional beam scanning means 102a to 102c after being condensed by condenser lenses 109a to 109c. An image data is divided into R, G and B data, signals of which are multiplexed by a dichroic prism 106 to form a color image after being focused by field lenses 104a to 104c and inputted to spatial modulation elements 105a to 105c. The image multiplexed in this way is projected onto a screen 108 by a projection lens 107. A concave lens 109 for equalizing the spot size of the G-light to those of the R-light and B-light in the spatial modulation element 105b is inserted in a light path from the G light source 101b to the spatial modulation element 105b.

Although each of the R light source and B light source is constructed by one semiconductor laser in this embodiment, it may be constructed such that outputs of a plurality of semiconductor lasers can be obtained as one output, for example, by grouping bundle fibers together. With such an arrangement, the widths of the wavelength spectra of the R light source and B light source can be increased, whereby coherency can be mitigated to suppress speckle noises of the light sources. Similarly for the G light source, G-light outputs of a plurality of semiconductor lasers may be respectively guided by output fibers, and these output fibers may be grouped together into one fiber, for example, by using bundle fibers so as to suppress speckle noise.

Further, the diffusers, a lenticular lens and the like are arranged before a two-dimensional spatial modulator. These members are disposed to remove speckle noises generated by the use of laser beams having strong coherency as light sources. By swinging these speckle noise removing means, speckle noise seen during a response time of human eyes can be reduced. In other words, a wavelength converter for generating a harmonic wave by causing a fundamental wave emitted from a fiber laser to the G light source 101b to be incident on the wavelength conversion element is used in this embodiment. The construction of the laser display is characterized by this wavelength converter.

As described above, the laser display of this embodiment can have a high luminance and a thin configuration since the laser light sources are used as the R, G and B light sources. Further, a laser display having a small size, a light weight and a low power consumption can be realized since the wavelength converter including the fiber laser is used as the G light source and the fiber length can be half the length of the conventional one. In addition, since the wavelength converter of this embodiment has a short fiber length and can suppress the absorbed amount of the fundamental wave, it can output green laser lights having wavelengths shorter than before, e.g. green laser lights having wavelengths of 532 nm and 510 nm and 540 nm slightly shorter and longer than 532 nm. Thus, the color reproduction range can be more expanded, for example, to 510 nm than the conventional sRGB standard and color representation close to original colors is possible. In other words, the laser display of this embodiment can expand the color reproduction range more than conventional laser displays.

Beside the two-dimensional image display device having such a construction, it is also possible to have such a mode for projecting a light from behind the screen (rear projection display).

Although the reflection-type spatial modulation elements integrated with micromirrors are used in FIG. 20, it is, of course, possible to use modulation elements using crystal or two-dimensional modulation elements with galvanometer mirrors or mechanical microswitches (MEMS).

In the case of light modulation elements having less influence of polarization components on a light modulation property such as the reflection-type spatial modulation elements, MEMS and galvanometer mirrors as in this embodiment, an optical fiber for propagating a harmonic wave needs not be a polarization maintaining fiber such as a PANDA (polarization-maintaining and absorption-reducing) fiber. However, upon using a two-dimensional modulation device using crystal, it is preferable to use a polarization maintaining fiber since the modulation characteristic and polarization characteristic are largely related.

Although the laser fiber used is doped with Yb as a rare-earth element in the above sixth to eleventh embodiments, a fiber laser doped with other rare-earth elements, e.g. at least one selected from Nd and Er may be used. Further, depending on the wavelength and output of the wavelength converter, it is possible to change a doped amount of the rare-earth element or to dope a plurality of rare-earth elements.

Although the lasers having wavelengths of 915 nm and 976 nm are used as the laser light source for excitation of the fiber laser in the above sixth to eleventh embodiments, a laser light source having different wavelengths may be used provided that it can excite the fiber laser.

Although the wavelength converter uses a periodic polarization reversal $MgO:LiNbO_3$ in the above sixth to eleventh embodiments, the wavelength converter may be made of another material or have another construction, e.g. may use potassium titanyl phosphate ($KTiOPO_4$:KTP) or $MgO:LiTaO_3$ periodically having a polarization reversal structure.

As described above, according to the wavelength converter of the present invention, the excitation light to be incident on the fiber generates the seed light of the fundamental wave by being absorbed while making one round time in the fiber, and the seed light of the fundamental wave oscillates by being amplified by this excitation light to become the fundamental wave. Since the fiber laser efficiently absorbs the excitation light with the fiber having half the length of the conventional one, oscillates the fundamental wave with a high gain and efficiently emits the fundamental wave from the extraction mirror, the wavelength converter can be constructed to have a smaller size, a higher efficiency and a lower power consumption. Further, since the fundamental wave is returned more by the fiber grating as compared to the conventional construction, a large interval for amplifying the fundamental wave can be taken and a fiber laser light source having a high efficiency and a low power consumption can be constructed. Since a fundamental wave having a wavelength in the vicinity of 1030 nm, which was difficult to generate such an output as to exceed 5 W by the conventional construction, can be generated, the wavelength converter of the present invention can output a W-class green laser light at a short wavelength in the vicinity of 510 nm.

Further, since the excitation light can be uniformly absorbed in the fiber, there is no likelihood of a damage by the laser light and a W-class visible laser light can be stably outputted from the wavelength converter, thereby fulfilling a large effect of being able to emit a green laser light having a high luminosity factor.

Furthermore, since the excitation light is entirely absorbed in the fiber, the fiber deterioration caused, for example, by the absorption of the excitation light that is not absorbed at the connected part of the fibers as in the prior art can be prevented, whereby the reliability of the fiber laser and the wavelength converter can be improved.

The two-dimensional image display device of the present invention using the wavelength converter having such characteristics fulfills large effects of being able to have a thin construction, a higher efficiency and a low power consumption in addition to the high luminance, wide color reproduction range and high image equality.

Since the wavelength converters and image display devices of the present invention have a high luminance, a wide color reproduction range and a low power consumption, they are useful in the display field such as large-scale displays and high-luminance displays.

The present invention can be summarized as follows from the above respective embodiments. Specifically, a fiber device according to the present invention comprises a laser cavity including a fiber containing a laser active substance, the fiber having at least one fiber grating formed therein; and a laser light source for emitting an excitation light to be incident on the fiber, wherein the laser cavity shifts an oscillation wavelength of a fundamental wave of a laser emitted therefrom.

The above fiber device can emit fundamental waves of lasers having different oscillation wavelengths.

It is preferable that a returning unit returning a part of the fundamental wave of the laser emitted from the laser cavity to the laser cavity and changing an amount of a return light to the laser cavity is further provided; that the fiber grating includes a first fiber grating arranged at a side of the fiber toward the laser light source and a second fiber grating arranged at an emission side of the fiber; and that the laser cavity oscillates a first fundamental wave using a reflection light from the second fiber grating if the returning unit causes the amount of the return light from the returning unit to fall to or below an amount of the reflection light from the second fiber grating, while oscillating a second fundamental wave using the return light from the returning unit if the returning unit causes the amount of the return light from the returning unit to exceed the amount of the reflection light from the second fiber grating.

In this case, the oscillation wavelength of the fundamental wave of the emitted laser can be shifted by increasing or decreasing the amount of the return light from the returning unit relative to the amount of the reflection light from the second fiber grating to switch the construction of the cavity.

It is also preferable that the fiber grating further includes a third fiber grating arranged between the first and second fiber gratings and near the first fiber grating; that the band of the third fiber grating is located at a longer wavelength side than that of the second fiber grating; and that the laser cavity oscillates the first fundamental wave between the first and second fiber gratings if the amount of the return light from the returning unit falls to or below the amount of the reflection light from the second fiber grating while oscillating the second fundamental wave between the third fiber grating and the returning unit if the amount of the return light from the returning unit exceeds the amount of the reflection light from the second fiber grating.

In this case, the oscillation by the third fiber grating becomes easier to occur by locating the band of the third fiber grating at the longer wavelength side than that of the second fiber grating. Thus, the oscillation between the first and second fiber gratings can be more smoothly shifted to the one between the third fiber grating and the returning unit.

It is preferable that the returning unit includes a reflecting member for reflecting the fundamental wave of the laser emitted from the laser cavity and a driving portion for driving the reflecting member to change a reflecting direction of a reflection light from the reflecting member relative to the laser cavity; and that the driving portion drives the reflecting member to increase and decrease an amount of the reflection light from the reflecting member to be incident on the laser cavity.

In this case, the returning unit can be realized by a simple construction since the amount of the return light can be increased or decreased by changing the reflecting direction of the reflecting member.

The returning unit preferably includes a reflecting member for reflecting the fundamental wave of the laser emitted from the laser cavity in a direction toward the laser cavity, and a reducing portion arranged at a side of the reflecting member toward the laser cavity and capable of changing an amount of a light transmitting therethrough to increase and decrease an amount of a reflection light from the reflecting member.

In this case, the returning unit can be realized by a simple construction since the amount of the return light can be increased or decreased by increasing or decreasing the amount of the light transmitting through the reducing portion.

A wavelength converter according to the present invention comprises the above fiber device; and a wavelength conversion element for converting a fundamental wave of a laser emitted from the laser cavity into a harmonic wave.

In the above wavelength converter, harmonic waves having different oscillation wavelengths can be oscillated by wavelength-converting fundamental waves of lasers having different oscillation wavelengths.

It is preferable that a returning unit returning a part of the fundamental wave of the laser emitted from the laser cavity to the laser cavity and changing an amount of a return light to the laser cavity is further provided; that the fiber grating includes a first fiber grating arranged at a side of the fiber toward the laser light source and a second fiber grating arranged at an emission side of the fiber; that the laser cavity oscillates a first fundamental wave using a reflection light from the second fiber grating if the returning unit causes the amount of the return light from the returning unit to fall to or below an amount of the reflection light from the second fiber grating, while oscillating a second fundamental wave using the return light from the returning unit if the returning unit causes the amount of the return light from the returning unit to exceed the amount of the reflection light from the second fiber grating; and that the wavelength conversion element wavelength-converts at least one of the first and second fundamental waves.

In this case, the oscillation wavelength of the fundamental wave of the emitted laser can be shifted by increasing or decreasing the amount of the return light from the returning unit relative to the amount of the reflection light from the second fiber grating to switch the construction of the cavity.

It is also preferable that the fiber grating further includes a third fiber grating arranged between the first and second fiber gratings and near the first fiber grating; that the band of the third fiber grating is located at a longer wavelength side than that of the second fiber grating; and that the laser cavity oscillates the first fundamental wave between the first and second fiber gratings if the amount of the return light from the returning unit falls to or below the amount of the reflection light from the second fiber grating, while oscillating the second fundamental wave between the third fiber grating and the returning unit if the amount of the return light from the returning unit exceeds the amount of the reflection light from the second fiber grating.

In this case, the oscillation by the third fiber grating becomes easier to occur by locating the band of the third fiber grating at the longer wavelength side than that of the second fiber grating. Thus, the oscillation between the first and second fiber gratings can be more smoothly shifted to the one between the third fiber grating and the returning unit.

It is preferable that the returning unit includes a reflecting member for reflecting the fundamental wave of the laser emitted from the laser cavity and a driving portion for driving the reflecting member to change a reflecting direction of a reflection light from the reflecting member relative to the laser cavity; and that the driving portion drives the reflecting member to increase and decrease an amount of the reflection light from the reflecting member to be incident on the laser cavity.

In this case, the returning unit can be realized by a simple construction since the amount of the return light can be increased or decreased by changing the reflecting direction of the reflecting member.

It is preferable that the laser cavity, the wavelength conversion element and the reflecting member are arranged in this order; that a film is formed on an outer surface of the reflecting member; and that the film transmits the harmonic wave emitted from the wavelength conversion element and reflects the fundamental wave of the laser emitted from the laser cavity.

In this case, the wavelength converter can be miniaturized since the laser cavity, the wavelength converter and the reflecting member can be substantially linearly arranged.

The returning unit preferably includes a reflecting member for reflecting the fundamental wave of the laser emitted from the laser cavity in a direction toward the laser cavity, and a reducing portion arranged at a side of the reflecting member toward the laser cavity and capable of changing an amount of a light transmitting therethrough to increase and decrease an amount of a reflection light from the reflecting member.

In this case, the returning unit can be realized by a simple construction since the amount of the return light can be increased or decreased by increasing or decreasing the amount of the light transmitting through the reducing portion.

It is preferable that the laser cavity, the reducing portion, the wavelength conversion element and the reflecting member are arranged in this order; that a film is formed on an outer surface of the reflecting member; and that the film transmits the harmonic wave emitted from the wavelength conversion element and reflects the fundamental wave of the laser emitted from the laser cavity.

In this case, the laser cavity, the wavelength converter and the reflecting member can be substantially linearly arranged without the harmonic wave emitted from the wavelength converter transmitting through the reducing portion. Thus, the wavelength converter can be miniaturized without reducing the light amount of the harmonic wave.

It is preferable that the wavelength conversion element has a first area for wavelength-converting the first fundamental wave by satisfying a phase matching condition in conformity with the oscillation wavelength of the first fundamental wave and a second area for wavelength-converting the second fundamental wave by satisfying a phase matching condition in conformity with the oscillation wavelength of the second fundamental wave; that the first and second areas are arranged in sequence in incident directions of the first and second fundamental waves; and that the first and second fundamental waves successively pass the first and second areas.

In this case, the respective fundamental waves can be incident on the first and second areas where the phase matching conditions corresponding to the respective oscillation wavelengths of the first and second fundamental waves can be satisfied. Therefore, it becomes possible to oscillate two harmonic waves having different oscillation wavelengths.

It is preferable that the fiber is formed by optically connecting a first fiber that is a single-mode fiber containing the laser active substance and a second fiber that is a polarization maintaining fiber having the fiber grating formed therein; that the fiber grating has a plurality of bands corresponding to a plurality of polarization axes of the second fiber and emits a reflection light having a plurality of peaks by reflecting an incident light in the plurality of bands; that the laser cavity oscillates fundamental waves at a plurality of oscillation wavelengths using the reflection light having the plurality of peaks from the fiber grating; and that the wavelength conversion element wavelength-converts at least one of the fundamental waves having the plurality of oscillation wavelengths.

In this case, since the first fiber is the single-mode fiber and the second fiber is the polarization maintaining fiber, a laser light having a plurality of bands obtained by utilizing differences in the refractive indices of the plurality of polarization axes in the polarization maintaining fiber can be oscillated in the single-mode fiber independent of polarization. Thus, lights in the respective bands are not lost, wherefore fundamental waves having a plurality of oscillation wavelengths can be oscillated.

It is preferable that the laser cavity further includes a first reflection surface arranged near the fiber grating and a second reflection surface arranged near the laser light source; and that the excitation light emitted from the laser light source is reflected by the first reflection surface after being incident on the second reflection surface, thereby making one round trip between the second and first reflection surfaces.

In this case, the excitation light from the laser light source is reflected by the first reflection surface of the fiber after being incident on the second reflection surface of the fiber, thereby making one round trip in the fiber to be efficiently absorbed depending on an energy level involved with the laser active substance. Conventionally, a fiber laser has needed to have such a length as to substantially completely absorb an excitation light, but the excitation light is absorbed using a fiber having half the length by being reflected in the fiber laser. Thus, the fiber laser efficiently absorbs the excitation light using a fiber having half the length of the conventional one and efficiently emits the fundamental wave by oscillating it with a high gain, wherefore the wavelength converter can be constructed to have a small size, a high efficiency and a low power consumption.

Further, the excitation light can be substantially completely absorbed using the fiber having half the length as compared to the conventional technology and, at the same time, the absorbed amount of the fundamental wave is halved in proportion to the length of the fiber. Thus, the fundamental wave of the fiber laser can be yielded as a high-output laser light even at a shorter wavelength side near 1030 nm where the light absorbed amount is large. As a result, if a fundamental wave having a shorter wavelength than usual is used as an incident light, the harmonic wave outputted from the wavelength conversion element can have a shorter wavelength than usual, e.g. a green laser light having a wavelength near 515 nm where a luminosity factor is high can be obtained with a W-class light output.

Further, by providing the first reflection surface at the other end of the fiber, the number of optical components such as lenses and mirrors for transmitting lights between the fiber and the first reflection surface can be reduced and adjustments therefor become unnecessary, wherefore cost reduction and improvement in reliability can be accomplished.

Further, the fundamental wave can be efficiently extracted by providing the second reflection surface at the one end of the fiber.

The laser cavity preferably further includes a unification unit arranged near the second reflection surface for unifying polarization directions of lights emitted from the first fiber to unify the polarization directions of the fundamental waves of the lasers emitted from the laser cavity.

In this case, the polarization directions of the fundamental waves having a plurality of oscillation wavelengths and emitted from the first fiber can be unified. Thus, the wavelength of the fundamental wave can be more efficiently converted in the wavelength conversion element.

It is preferable that the unification unit is an emission end surface of the first fiber and a cutting angle of the emission end surface is a Brewster angle to an optical axis direction of the first fiber.

In this case, by setting the cutting angle of the emission end surface of the first fiber to a Brewster angle, the polarization directions of the fundamental wave having a plurality of oscillation wavelengths can be unified. Thus, the unification unit can be realized by a simple construction.

It is further preferable to comprise a light transmitting unit for transmitting the excitation light emitted from the laser light source to the second reflection surface and transmitting the fundamental wave of the laser emitted from the laser cavity to the wavelength conversion element.

In this case, the fundamental wave of the laser can be efficiently transmitted to the wavelength conversion element since it does not return to the laser light source.

The light transmitting unit preferably includes a reflecting member transmitting the excitation light emitted from the laser light source and reflecting the fundamental wave of the laser emitted from the laser cavity.

In this case, the extraction of the fundamental wave can be realized by a simple construction.

A wavelength selection layer for transmitting the excitation light emitted from the laser light source and reflecting the fundamental wave of the laser emitted from the laser cavity is preferably formed on an outer surface of the reflecting member.

In this case, the high-output fundamental wave from the fiber laser is reflected by the wavelength selection layer and is not incident on the laser light source emitting the excitation light, wherefore the damage of the laser light source by the incidence of the fundamental wave can be further prevented.

The reflecting member preferably includes a narrow-band transmission filter.

In this case, the half bandwidth of the wavelength of the excitation light becomes smaller and the excitation light is more efficiently absorbed by the fiber laser, wherefore the light output conversion from the excitation light into the fundamental wave can be realized with even higher efficiency.

It is preferable that a diffraction member for diffracting a light having a wavelength in a specified narrow band out of the excitation light reflected by the reflecting member after being emitted from the laser light source; and that a diffracted light by the diffraction member is returned to the laser light source to fix the oscillation wavelength of the laser light source to the wavelength of the diffracted light.

In this case, the excitation light is more efficiently absorbed in the fiber laser by fixing the wavelength, at which the absorbed amount in the fiber laser is large, as the wavelength of the excitation light.

The diffraction member preferably includes a reflection-type diffraction grating for reflecting an incident light.

In this case, a light of a specified wavelength can be diffracted only by adjusting one diffraction grating, thereby facilitating a control for adjusting the wavelength section.

The diffraction member preferably includes a transmission-type diffraction grating for transmitting an incident light transmit and a reflection mirror for reflecting the light transmitting through the diffraction grating.

In this case, the range of wavelengths of lights that can be diffracted can be widened since the transmission-type diffraction grating is used. Further, the wavelength selection and the emission direction of the diffracted light can be independently controlled since an adjustment is made by a combination of the diffraction grating and the reflection mirror.

The first reflection surface preferably includes a multilayer film.

In this case, the first reflection surface can reflect the excitation light at a reflectance substantially close to total reflection, and the excitation light can be more efficiently utilized.

The second reflection surface preferably includes a polarization mirror.

In this case, a polarization surface of the optical system can be more easily adjusted.

The wavelength selection layer of the reflecting member preferably includes a multilayer film.

In this case, a loss by the light absorption can be further reduced, and a reflecting member having an improved wavelength selectability between the excitation light and the fundamental wave can be realized.

The laser light source preferably includes a laser element for emitting an excitation light, a lens for shaping the excitation light emitted from the laser element, and a casing for containing the laser element and the lens.

In this case, the optical system for introducing the excitation light emitted from the laser light source to the fiber laser can have a smaller size and a higher coupling efficiency.

The lens is preferably a cylindrical lens.

In this case, the excitation light emitted from the laser light source can have an aspect ratio thereof improved without reducing the light amount thereof and can be more easily optically coupled to the fiber laser. Thus, the excitation light can be more efficiently utilized.

It is preferable to further comprise a fundamental wave detector for detecting a part of the fundamental wave output and an output controller for controlling the output of the harmonic wave emitted from the wavelength conversion element based on a detection value by the fundamental wave detector.

In this case, the phase matching condition of the fundamental wave in the wavelength conversion element can be accurately controlled and the output of a stable harmonic wave can be more stably obtained from the wavelength conversion element by controlling temperature increases in the fiber grating and the wavelength conversion element caused by an increase of the fundamental wave output.

The wavelength of the harmonic wave is preferably 510 to 540 nm and the output of the harmonic wave is preferably 1 W or higher.

In this case, a green laser output light having a high luminosity factor can be obtained, and the wavelength converter can represent colors further close to original colors as a display having a good color reproducibility.

The laser cavity preferably further includes a third reflection surface arranged near an emission end of the wavelength converter and oscillates the fundamental wave between the fiber grating and the third reflection surface while letting the fundamental wave transmit through the wavelength conversion element.

In this case, more efficient wavelength conversion can be realized since the wavelength conversion element is arranged in the cavity including the fiber grating and the third reflection surface.

A cutting angle of an emission end surface of the wavelength converter is preferably a Brewster angle to an optical axis direction of the wavelength conversion element so as to unify polarization directions of harmonic waves emitted from the wavelength conversion element.

In this case, the polarization directions of the harmonic waves having a plurality of oscillation wavelengths can be unified by setting the cutting angle of the emission end surface of the wavelength conversion element to a Brewster angle.

It is preferable that there are two oscillation wavelengths of the fundamental waves; that the wavelength conversion element has a first area for wavelength-converting the fundamental wave of one oscillation wavelength by satisfying a phase matching condition in conformity with the one oscillation wavelength of the fundamental wave and a second area for wavelength-converting the fundamental wave of the other oscillation wavelength by satisfying a phase matching condition in conformity with the other oscillation wavelength of the fundamental wave; that the first and second areas are arranged in sequence in incident directions of the fundamental waves; and that the fundamental waves successively pass the first and second areas.

In this case, the respective fundamental waves can be incident on the first and second areas where the phase matching conditions in conformity with the respective oscillation wavelengths of the fundamental waves can be satisfied. Thus, two harmonic waves having different oscillation wavelengths can be oscillated.

An image forming apparatus according to the present invention comprises a plurality of laser light sources; a scanning unit for scanning laser lights emitted from the laser light sources; and a screen for displaying an image using the laser lights emitted from the respective laser light sources, wherein the laser light sources at least include light sources for emitting red, green and blue lights, and at least the green light source includes the above wavelength converter.

Since a green laser light having a high luminosity factor can be obtained in this image display device, the image display device can represent colors closer to original colors by being used as a display or the like having a good color reproducibility.

This application is based on patent applications No. 2006-186409 and No. 2006-188875 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A fiber device, comprising:
   a laser cavity including a fiber containing a laser active substance, the fiber having at least one fiber grating formed therein;
   a laser light source for emitting an excitation light to be incident on the fiber,
   wherein the laser cavity shifts an oscillation wavelength of a fundamental wave of a laser emitted therefrom; and
   a returning unit for returning a part of the fundamental wave of the laser emitted from the laser cavity to the laser cavity and changing an amount of a return light to the laser cavity; wherein:
   the fiber grating includes a first fiber grating arranged at a side of the fiber toward the laser light source and a second fiber grating arranged at an emission side of the fiber; and
   the laser cavity oscillates a first fundamental wave using a reflection light from the second fiber grating if the returning unit causes the amount of the return light from the returning unit to fall to or below an amount of the reflection light from the second fiber grating, while oscillating a second fundamental wave using the return light from the returning unit if the returning unit causes the amount of the return light from the returning unit to exceed the amount of the reflection light from the second fiber grating.

2. A fiber device according to claim 1, wherein:
   the fiber grating further includes a third fiber grating arranged between the first and second fiber gratings and near the first fiber grating;
   the band of the third fiber grating is located at a longer wavelength side than that of the second fiber grating; and
   the laser cavity oscillates the first fundamental wave between the first and second fiber gratings if the amount of the return light from the returning unit falls to or below the amount of the reflection light from the second fiber grating, while oscillating the second fundamental wave between the third fiber grating and the returning unit if the amount of the return light from the returning unit exceeds the amount of the reflection light from the second fiber grating.

3. A fiber device according to claim 1, wherein:
   the returning unit includes a reflecting member for reflecting the fundamental wave of the laser emitted from the laser cavity and a driving portion for driving the reflecting member to change a reflecting direction of a reflection light from the reflecting member relative to the laser cavity; and the driving portion drives the reflecting member to increase and decrease an amount of the reflection light from the reflecting member to be incident on the laser cavity.

4. A fiber device according to claim 1, wherein the returning unit includes:

a reflecting member for reflecting the fundamental wave of the laser emitted from the laser cavity in a direction toward the laser cavity; and a reducing portion arranged at a side of the reflecting member toward the laser cavity and changing an amount of a light transmitting therethrough to increase and decrease an amount of a reflection light from the reflecting member.

5. A fiber device, comprising:

a laser cavity including a fiber containing a laser active substance, the fiber having at least one fiber rating formed therein;

a laser light source for emitting an excitation light to be incident on the fiber; and a light transmitting unit for transmitting the excitation light emitted from the laser light source to the second reflection surface and transmitting the fundamental wave of the laser emitted from the laser cavity to the wavelength conversion element wherein:

the laser cavity shifts an oscillation wavelength of a fundamental wave of a laser emitted therefrom;

the fiber is formed by optically connecting a first fiber that is a single-mode fiber containing a laser active substance and a second fiber that is a polarization maintaining fiber having the fiber grating formed therein;

the fiber grating has a plurality of bands corresponding to a plurality of polarization axes of the second fiber and emits a reflection light having a plurality of peaks by reflecting an incident light in the plurality of bands;

the laser cavity oscillates the fundamental waves at a plurality of oscillation wavelengths using the reflection light having the plurality of peaks from the fiber grating;

the laser cavity further includes a first reflection surface arranged near the fiber grating and a second reflection surface arranged near the laser light source; and the excitation light emitted from the laser light source is reflected by the first reflection surface after being incident on the second reflection surface, thereby making one round trip between the second and first reflection surfaces;

said wavelength converter further comprising a light transmitting unit for transmitting the excitation light emitted from the laser light source to the second reflection surface and transmitting the fundamental wave of the laser emitted from the laser cavity;

wherein the light transmitting unit includes a reflecting member for transmitting the excitation light emitted from the laser light source and reflecting the fundamental wave of the laser emitted from the laser cavity.

6. A wavelength converter comprising:

a fiber device, comprising:

a laser cavity including a fiber containing a laser active substance, the fiber having at least one fiber grating formed therein; and a laser light source for emitting an excitation light to be incident on the fiber, wherein the laser cavity shifts an oscillation wavelength of a fundamental wave of a laser emitted therefrom;

a wavelength conversion element for converting a fundamental wave of a laser emitted from the laser cavity into a harmonic wave; and a returning unit for returning a part of the fundamental wave of the laser emitted from the laser cavity to the laser cavity and changing an amount of a return light to the laser cavity, wherein:

the fiber grating includes a first fiber grating arranged at a side of the fiber toward the laser light source and a second fiber grating arranged at an emission side of the fiber;

the laser cavity oscillates a first fundamental wave using a reflection light from the second fiber grating if the returning unit causes the amount of the return light from the returning unit to fall to or below an amount of the reflection light from the second fiber grating, while oscillating a second fundamental wave using the return light from the returning unit if the returning unit causes the amount of the return light from the returning unit to exceed the amount of the reflection light from the second fiber grating; and the wavelength conversion element wavelength-converts at least one of the first and second fundamental waves.

7. A wavelength converter according to claim 6, wherein:

the fiber grating further includes a third fiber grating arranged between the first and second fiber gratings and near the first fiber grating;

the band of the third fiber grating is located at a longer wavelength side than that of the second fiber grating; and the laser cavity oscillates the first fundamental wave between the first and second fiber gratings if the amount of the return light from the returning unit falls to or below the amount of the reflection light from the second fiber grating, while oscillating the second fundamental wave between the third fiber grating and the returning unit if the amount of the return light from the returning unit exceeds the amount of the reflection light from the second fiber grating.

8. A wavelength converter according to claim 6, wherein:

the returning unit includes a reflecting member for reflecting the fundamental wave of the laser emitted from the laser cavity and a driving portion for driving the reflecting member to change a reflecting direction of a reflection light from the reflecting member relative to the laser cavity; and the driving portion drives the reflecting member to increase and decrease an amount of the reflection light from the reflecting member to be incident on the laser cavity.

9. A wavelength converter according to claim 8, wherein:

the laser cavity, the wavelength conversion element and the reflecting member are arranged in the following order: laser cavity, wavelength conversion element, reflecting member;

a film is formed on an outer surface of the reflecting member; and the film transmits the harmonic wave emitted from the wavelength conversion element and reflects the fundamental wave of the laser emitted from the laser cavity.

10. A wavelength converter according to claim 6, wherein the returning unit includes:

a reflecting member for reflecting the fundamental wave of the laser emitted from the laser cavity in a direction toward the laser cavity; and a reducing portion arranged at a side of the reflecting member toward the laser cavity, for changing an amount of a light transmitting therethrough to increase and decrease an amount of a reflection light from the reflecting member.

11. A wavelength converter according to claim 10, wherein:
the laser cavity, the reducing portion, the wavelength conversion element and the reflecting member are arranged in the following order: laser cavity, wavelength conversion element, reflecting member;
a film is formed on an outer surface of the reflecting member; and
the film transmits the harmonic wave emitted from the wavelength conversion element and reflects the fundamental wave of the laser emitted from the laser cavity.

12. A wavelength converter according to claim 6, wherein:
the wavelength conversion element has a first area for wavelength-converting the first fundamental wave by satisfying a phase matching condition in conformity with the oscillation wavelength of the first fundamental wave and a second area for wavelength-converting the second fundamental wave by satisfying a phase matching condition in conformity with the oscillation wavelength of the second fundamental wave;
the first and second areas are arranged in sequence in incident directions of the first and second fundamental wave; and
the first and second fundamental waves successively pass the first and second areas.

13. An image forming apparatus, comprising:
a plurality of laser light sources;
a scanning unit for scanning laser lights emitted from the laser light sources; and
a screen for displaying an image using the laser lights emitted from the respective laser light sources,
wherein the laser light sources at least include light sources for emitting red, green and blue lights, and at least the green light source includes the wavelength converter according to claim 6.

14. A wavelength converter, comprising:
a laser cavity including a fiber containing a laser active substance, the fiber having at least one fiber grating formed therein;
a laser light source for emitting an excitation light to be incident on the fiber, and
a wavelength conversion element for converting a fundamental wave of a laser emitted from the laser cavity into a harmonic wave;
wherein:
the laser cavity shifts an oscillation wavelength of a fundamental wave of a laser emitted therefrom;
the fiber is formed by optically connecting a first fiber that is a single-mode fiber containing a laser active substance and a second fiber that is a polarization maintaining fiber having the fiber grating formed therein;
the fiber grating has a plurality of bands corresponding to a plurality of polarization axes of the second fiber and emits a reflection light having a plurality of peaks by reflecting an incident light in the plurality of bands;
the laser cavity oscillates the fundamental waves at a plurality of oscillation wavelengths using the reflection light having the plurality of peaks from the fiber grating;
the wavelength conversion element wavelength-converts at least one of the fundamental waves having the plurality of oscillation wavelengths;
the laser cavity further includes a first reflection surface arranged near the fiber grating and a second reflection surface arranged near the laser light source;
the excitation light emitted from the laser light source is reflected by the first reflection surface after being incident on the second reflection surface, thereby making one round trio between the second and first reflection surfaces; and
the laser cavity further includes a unification unit arranged near the second reflection surface for unifying polarization directions of lights emitted from the first fiber to unify the polarization directions of the fundamental waves of the lasers emitted from the laser cavity.

15. A wavelength converter according to claim 14, wherein:
the unification unit is an emission end surface of the first fiber; and
a cutting angle of the emission end surface is a Brewster angle to an optical axis direction of the first fiber.

16. A wavelength converter, comprising:
a laser cavity including a fiber containing a laser active substance, the fiber having at least one fiber grating formed therein;
a laser light source for emitting an excitation light to be incident on the fiber, and
a wavelength conversion element for converting a fundamental wave of a laser emitted from the laser cavity into a harmonic wave;
wherein:
the laser cavity shifts an oscillation wavelength of a fundamental wave of a laser emitted therefrom;
the fiber is formed by optically connecting a first fiber that is a single-mode fiber containing a laser active substance and a second fiber that is a polarization maintaining fiber having the fiber grating formed therein;
the fiber grating has a plurality of bands corresponding to a plurality of polarization axes of the second fiber and emits a reflection light having a plurality of peaks by reflecting an incident light in the plurality of bands;
the laser cavity oscillates the fundamental waves at a plurality of oscillation wavelengths using the reflection light having the plurality of peaks from the fiber grating;
the wavelength conversion element wavelength-converts at least one of the fundamental waves having the plurality of oscillation wavelengths;
the laser cavity further includes a first reflection surface arranged near the fiber grating and a second reflection surface arranged near the laser light source;
the excitation light emitted from the laser light source is reflected by the first reflection surface after being incident on the second reflection surface, thereby making one round trip between the second and first reflection surfaces;
said wavelength convert further comprises a light transmitting unit for transmitting the excitation light emitted from the laser light source to the second reflection surface and transmitting the fundamental wave of the laser emitted from the laser cavity to the wavelength conversion element; and
the light transmitting unit includes a reflecting member for transmitting the excitation light emitted from the laser light source and reflecting the fundamental wave of the laser emitted from the laser cavity.

17. A wavelength converter according to claim 16, wherein:
a wavelength selection layer is formed on an outer surface of the reflecting member; and the wavelength selection layer transmits the excitation light emitted from the laser light source and reflects the fundamental wave of the laser emitted from the laser cavity.

18. A wavelength converter according to claim 17, wherein the wavelength selection layer of the reflecting member includes a multilayer film.

19. A wavelength converter according to claim 16, wherein the reflecting member includes a narrow-band transmission filter.

20. A wavelength converter according to claim 16, further comprising a diffraction member for diffracting a light having a wavelength in a specified narrow band out of the excitation light reflected by the reflecting member after being emitted from the laser light source,
wherein diffracted light by the diffraction member is returned to the laser light source to fix the oscillation wavelength of the laser light source to the wavelength of the diffracted light.

21. A wavelength converter according to claim 20, wherein the diffraction member includes a reflection-type diffraction grating for reflecting an incident light.

22. A wavelength converter according to claim 21, wherein the diffraction member includes a transmission-type diffraction grating for transmitting an incident light and a reflection mirror for reflecting the light transmitting through the diffraction grating.

23. A wavelength converter according to claim 16, wherein the first reflection surface includes a multilayer film.

24. A wavelength converter according to claim 16, wherein the second reflection surface includes a polarization mirror.

25. A wavelength converter according to claim 16, wherein the laser light source includes:
a laser element for emitting an excitation light,
a lens for shaping the excitation light emitted from the laser element, and
a casing for containing the laser element and the lens.

26. A wavelength converter according to claim 25, wherein the lens is a cylindrical lens.

27. A wavelength converter according to claim 16, further comprising:
a fundamental wave detector for detecting a part of the fundamental wave output; and
an output controller for controlling the output of the harmonic wave emitted from the wavelength conversion element based on a detection value by the fundamental wave detector.

28. A wavelength converter according to claim 16, wherein:
the wavelength of the harmonic wave is 510 to 540 nm; and
the output of the harmonic wave is 1 W or higher.

29. A wavelength converter according to claim 16, wherein:
there are two oscillation wavelengths of the fundamental waves;
the wavelength conversion element has a first area for wavelength-converting the fundamental wave of one oscillation wavelength by satisfying a phase matching condition in conformity with the one oscillation wavelength of the fundamental wave and a second area for wavelength-converting the fundamental wave of the other oscillation wavelength by satisfying a phase matching condition in conformity with the other oscillation wavelength of the fundamental wave;
the first and second areas are arranged in sequence in incident directions of the fundamental waves; and
the fundamental waves successively pass the first and second areas.

30. An image forming apparatus, comprising:
a plurality of laser light sources;
a scanning unit for scanning laser lights emitted from the laser light sources; and
a screen for displaying an image using the laser lights emitted from the respective laser light sources,
wherein the laser light sources at least include light sources for emitting red, green and blue lights, and at least the green light source includes the wavelength converter according to claim 16.

31. A wavelength converter, comprising:
a laser cavity including a fiber containing a laser active substance, the fiber having at least one fiber grating formed therein;
a laser light source for emitting an excitation light to be incident on the fiber, and
a wavelength conversion element for converting a fundamental wave of a laser emitted from the laser cavity into a harmonic wave;
wherein:
the laser cavity shifts an oscillation wavelength of a fundamental wave of a laser emitted therefrom;
the fiber is formed by optically connecting a first fiber that is a single-mode fiber containing a laser active substance and a second fiber that is a polarization maintaining fiber having the fiber grating formed therein;
the fiber grating has a plurality of bands corresponding to a plurality of polarization axes of the second fiber and emits a reflection light having a plurality of peaks by reflecting an incident light in the plurality of bands;
the laser cavity oscillates the fundamental waves at a plurality of oscillation wavelengths using the reflection light having the plurality of peaks from the fiber grating;
the wavelength conversion element wavelength-converts at least one of the fundamental waves having the plurality of oscillation wavelengths;
the laser cavity further includes a first reflection surface arranged near the fiber grating and a second reflection surface arranged near the laser light source;
the excitation light emitted from the laser light source is reflected by the first reflection surface after being incident on the second reflection surface, thereby making one round trio between the second and first reflection surfaces; and
the laser cavity further includes a third reflection surface arranged near an emission end of the wavelength converter and oscillates the fundamental wave between the fiber grating and the third reflection surface while letting the fundamental wave transmit through the wavelength conversion element.

32. A wavelength converter according to claim 31, wherein a cuffing angle of an emission end surface of the wavelength converter is a Brewster angle to an optical axis direction of the wavelength conversion element so as to unify polarization directions of harmonic waves emitted from the wavelength conversion element.

* * * * *

UNITED STATES PATENT AND TRADEMARK OFFICE
CERTIFICATE OF CORRECTION

PATENT NO. : 7,576,908 B2  Page 1 of 1
APPLICATION NO. : 11/822443
DATED : August 18, 2009
INVENTOR(S) : Shinichi Shikii et al.

It is certified that error appears in the above-identified patent and that said Letters Patent is hereby corrected as shown below:

On the Cover Page

In Section (75) Inventors heading, the fourth inventor's name "Kauzhisa YAMAMOTO" should be --Kazuhisa YAMAMOTO--.

In the Claims

In column 37, claim 5, line 19, "one fiber rating" should be --one fiber grating--.

In column 40, claim 14, line 4, "one round trio" should be --one round trip--.

In column 42, claim 31, line 49, "one round trio" should be --one round trip--.

In column 42, claim 32, line 58, "a cuffing angle" should be --a cutting angle--.

Signed and Sealed this

Twentieth Day of April, 2010

David J. Kappos
*Director of the United States Patent and Trademark Office*